(12) United States Patent
Mori

(10) Patent No.: US 11,123,241 B2
(45) Date of Patent: Sep. 21, 2021

(54) VEHICLE SEAT AND VEHICLE SEAT ARRANGEMENT STRUCTURE

(71) Applicant: TOYOTA JIDOSHA KABUSHIKI KAISHA, Toyota (JP)

(72) Inventor: Kazuya Mori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/580,438

(22) Filed: Sep. 24, 2019

(65) Prior Publication Data
US 2020/0093662 A1 Mar. 26, 2020

(30) Foreign Application Priority Data
Sep. 26, 2018 (JP) .............................. JP2018-180753

(51) Int. Cl.
*A61G 3/08* (2006.01)
*B60N 2/30* (2006.01)
*B60R 21/207* (2006.01)
*B60R 22/02* (2006.01)

(52) U.S. Cl.
CPC ......... *A61G 3/0808* (2013.01); *B60N 2/3047* (2013.01); *B60R 21/207* (2013.01); *B60R 22/023* (2013.01); *B60R 2021/2078* (2013.01)

(58) Field of Classification Search
CPC ........ A61G 3/0808; A61G 5/121; A61G 5/10; B60N 2/3047; B60N 2/3013; B60N 2/245; B60N 2/3011; B60R 21/207; B60R 22/023; B60R 2021/2078; B60R 22/00; B60R 22/46; B60R 21/01
See application file for complete search history.

(56) References Cited

U.S. PATENT DOCUMENTS

| | | | | |
|---|---|---|---|---|
| 4,113,270 A | * | 9/1978 | Barecki | A61G 3/0808 188/2 F |
| 7,455,490 B1 | * | 11/2008 | Goosen | A61G 3/0808 410/7 |
| 8,469,431 B2 | * | 6/2013 | Andersson | A61G 3/0808 296/65.04 |
| 8,911,188 B1 | * | 12/2014 | Mill | B60N 2/245 410/23 |
| 9,833,367 B2 | * | 12/2017 | Mill | A61G 3/0808 |
| 9,994,182 B1 | * | 6/2018 | Jaradi | B60R 21/232 |
| 10,071,004 B2 | * | 9/2018 | Goss | A61G 3/0808 |
| 2008/0247837 A1 | * | 10/2008 | Cardona | A61G 3/0808 410/23 |
| 2009/0087278 A1 | * | 4/2009 | Girardin | B60N 2/242 410/3 |
| 2015/0328067 A1 | * | 11/2015 | Girardin | B60P 3/079 410/7 |

FOREIGN PATENT DOCUMENTS

JP 2008-149875 A 7/2008
JP 2018-090143 A 6/2018

* cited by examiner

*Primary Examiner* — Darlene P Condra
(74) *Attorney, Agent, or Firm* — Oliff PLC

(57) ABSTRACT

A vehicle seat includes a seatback, a seat cushion, and a wheelchair fixing device. The seat cushion is switchable to a tip-up state where the seat cushion has been tipped up so as to extend along the seatback. The seat cushion includes a seating surface and a rear surface that is on the opposite side of the seat cushion from the seating surface. The wheelchair fixing device is provided on the rear surface-side. The wheelchair fixing device is configured to fix a wheelchair to the seat cushion.

14 Claims, 21 Drawing Sheets

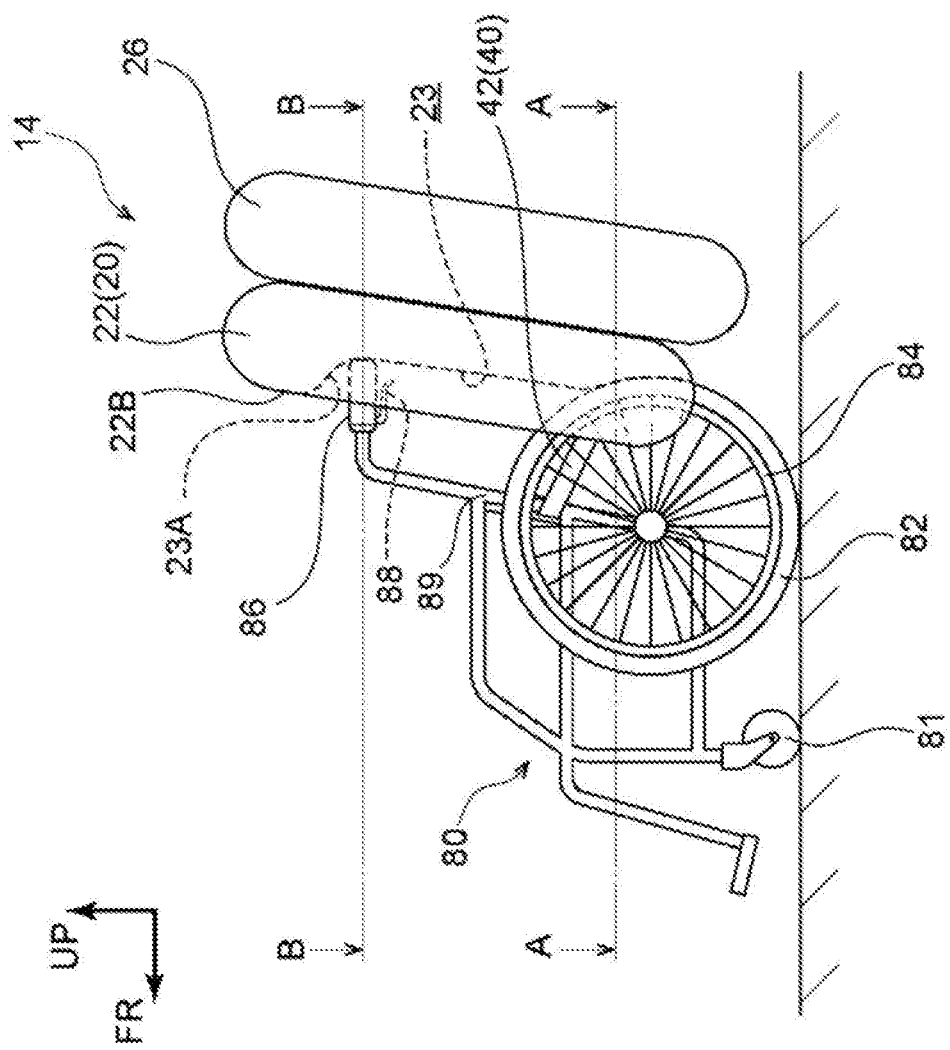

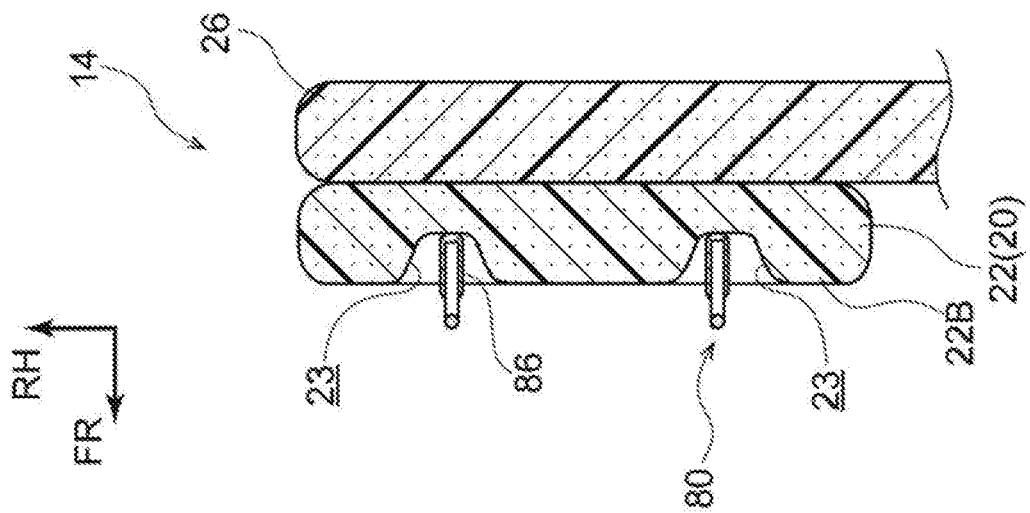
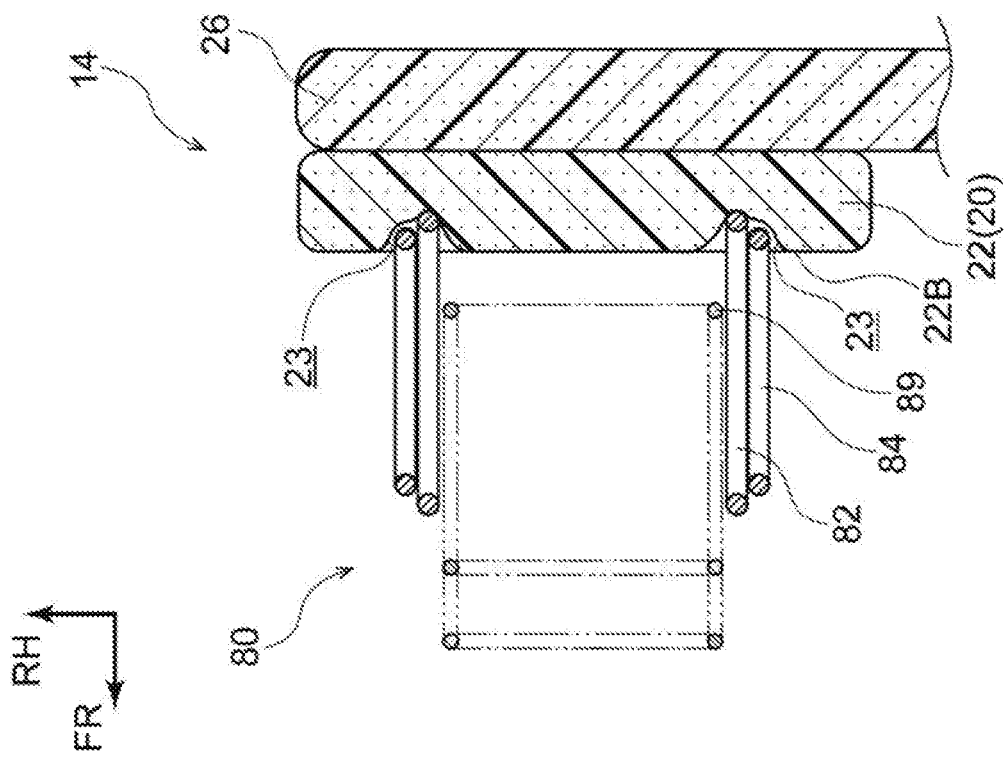

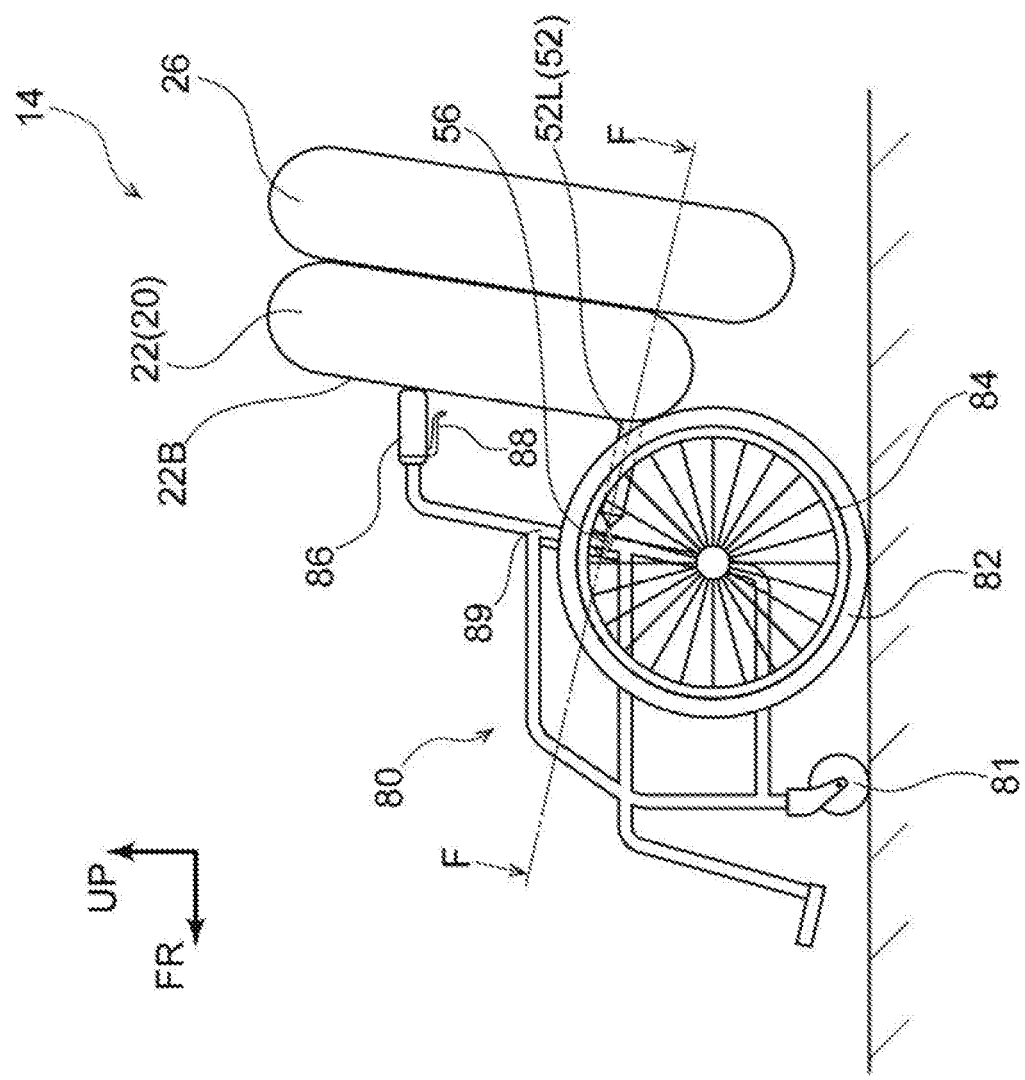

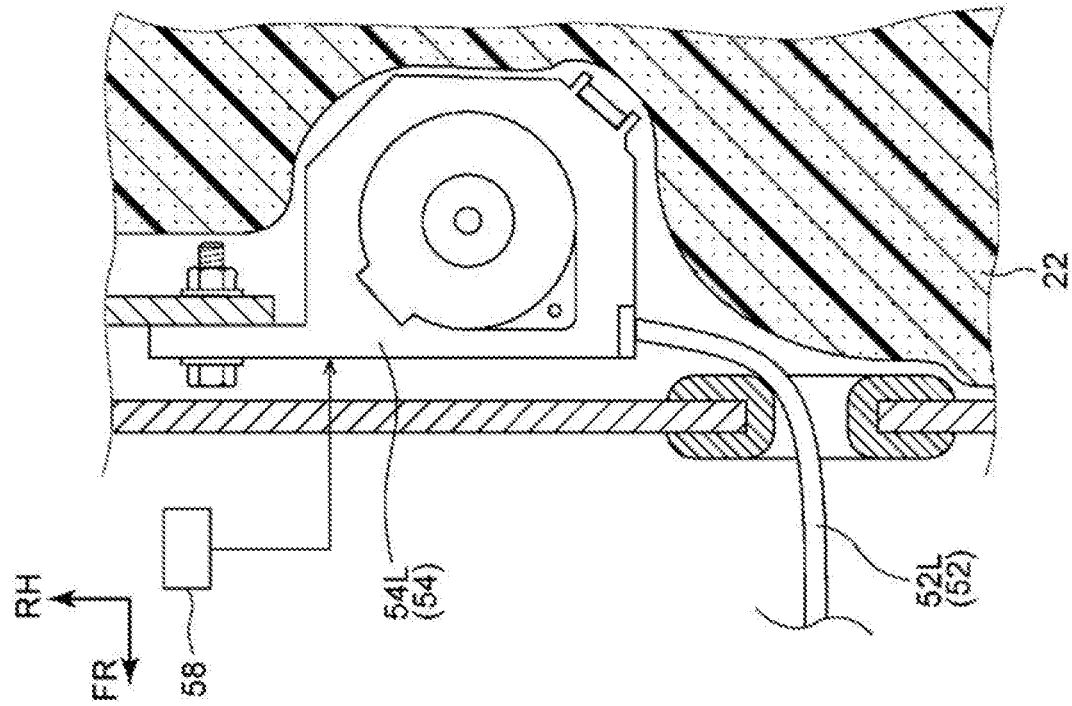
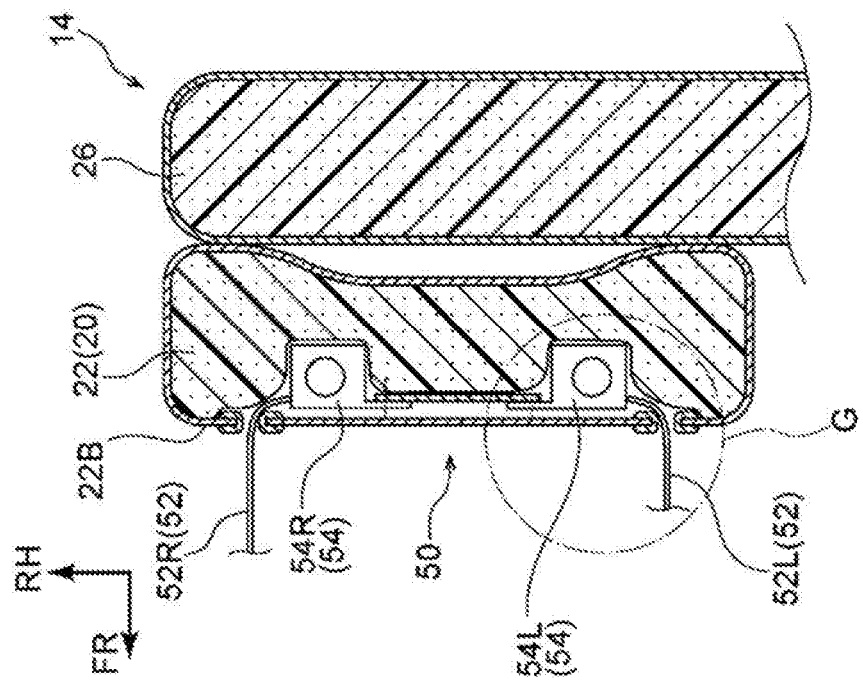

VEHICLE SEAT AND VEHICLE SEAT ARRANGEMENT STRUCTURE

INCORPORATION BY REFERENCE

The disclosure of Japanese Patent Application No. 2018-180753 filed on Sep. 26, 2018 including the specification, drawings and abstract is incorporated herein by reference in its entirety.

BACKGROUND

1. Technical Field

The disclosure relates to a vehicle seat, and relates also to a vehicle seat arrangement structure.

2. Description of Related Art

Japanese Unexamined Patent Application Publication No. 2018-90143 (JP 2018-90143 A) describes an automobile rear seat provided with a tip-up mechanism and including a seat cushion. JP 2018-90143 A discloses a structure that allows a wheelchair to be fixed on a front side of the seat cushion in a tip-up state such that the wheelchair faces forward in the vehicle front-rear direction.

SUMMARY

In conventional vehicles such as a vehicle described in JP 2018-90143 A, a wheelchair is typically fixed to a floor with a tie-down belt, and hence it is difficult for a wheelchair occupant seated in the wheelchair to fix the wheelchair by himself/herself. In view of this, there is a need for a technology that allows a wheelchair occupant to fix a wheelchair by himself/herself, for example, when there is no driver in a vehicle such as an autonomous taxi.

The disclosure provides a vehicle seat disposed in a vehicle configured to allow a wheelchair occupant seated in a wheelchair to get thereon, the vehicle seat being configured to allow the wheelchair occupant to fix the wheelchair by himself/herself.

A first aspect of the disclosure relates to a vehicle seat including a seatback, a seat cushion, and a wheelchair fixing device. The seat cushion is switchable to a tip-up state where the seat cushion has been tipped up so as to extend along the seatback. The seat cushion includes a seating surface and a rear surface that is on the opposite side of the seat cushion from the seating surface. The wheelchair fixing device is provided on the rear surface-side. The wheelchair fixing device is configured to fix a wheelchair to the seat cushion.

The vehicle seat according to the first aspect includes the wheelchair fixing device configured to fix the wheelchair to the seat cushion in the tip-up state. The wheelchair fixing device is provided on the rear surface-side of the seat cushion, and can be operated by a wheelchair occupant when the seat cushion is in the tip-up state. That is, the vehicle seat according to the first aspect is configured to allow a wheelchair occupant to fix the wheelchair by himself/herself.

In the first aspect, the wheelchair fixing device may be a two-point seatbelt device including: a restraining webbing provided with a restraining tongue plate; a restraining buckle engageable with the restraining tongue plate; and a restraining retractor including an automatic locking mechanism configured to lock extension of the restraining webbing.

The wheelchair fixing device of the vehicle seat having the above configuration is a two-point seatbelt device that includes a retractor including an automatic locking mechanism, such as an automatic locking retractor (ALR). With this configuration of the vehicle seat, a wheelchair occupant can easily fix the wheelchair by pushing the wheelchair against the seat cushion in the tip-up state and engaging the restraining tongue plate with the restraining buckle, and then operating the automatic locking mechanism. Because the restraining webbing of the wheelchair fixing device is used to fix a wheelchair, the wheelchair fixing device can be used to fix various kinds of wheelchairs.

In the above configuration, the restraining tongue plate and the restraining buckle may be exposed on the rear surface of the seat cushion, and the restraining tongue plate and the restraining buckle may be provided apart from each other such that the restraining tongue plate and the restraining buckle are respectively on opposite sides, in the seat-width direction, of the wheelchair that is fixed to the seat cushion such that a rear side of the wheelchair faces the rear surface of the seat cushion in the tip-up state.

In the vehicle seat having the above configuration, the restraining tongue plate and the restraining buckle are exposed on the rear surface of the seat cushion in the tip-up state. Thus, a wheelchair occupant can easily pull the restraining tongue plate such that the restraining tongue plate approaches the restraining buckle. Thus, the vehicle seat having this configuration allows the wheelchair occupant seated in the wheelchair to easily perform an operation for fixing the wheelchair.

The vehicle seat having the above configuration may further include an additional buckle for a wheelchair occupant, which is provided adjacent to the restraining buckle. The additional buckle may be engageable with a shared tongue plate that is shared with a seatbelt device for an ordinary occupant.

With the above configuration of the vehicle seat, even when the seat cushion is in the tip-up state and thus a buckle of the seatbelt device for an ordinary occupant cannot be used, the additional buckle can be used. Thus, the seatbelt device for an ordinary occupant can be used even when the seat cushion is in the tip-up state.

The vehicle seat having the above configuration may further include an additional webbing and an additional retractor. The additional webbing is provided on the restraining webbing-side in the seat-width direction. The additional webbing is provided with an additional tongue plate engageable with the additional buckle. The additional retractor is configured to retract the additional webbing.

With the above configuration of the vehicle seat, the seatbelt device dedicated for a wheelchair occupant can be used when the seat cushion is in the tip-up state. Thus, it is possible to prevent occurrence of a situation where a seatbelt does not appropriately fit a wheelchair occupant due to a difference in hip point between the wheelchair occupant and an occupant seated in the seat cushion.

In the first aspect, the seat cushion may include a recessed portion that is provided in the rear surface and that is recessed toward the seating surface. A handgrip and a wheel of the wheelchair may be housed in the recessed portion when the seat cushion is in the tip-up state.

With the above configuration of the vehicle seat, the wheel and the handgrip of the wheelchair are housed in the recessed portion of the seat cushion. Thus, the wheelchair can be fixed to the seat cushion, at a position that is rearward, in the seat front-rear direction, of a position at which the wheelchair is fixed to the seat cushion having no recessed portion. Further, displacement of the wheelchair in the seat-lateral direction can be prevented.

In the above configuration, the seat cushion may include a pair of the recessed portions, the recessed portions may be respectively provided in opposite side portions of the seat cushion in the seat-width direction, the rear surface of the seat cushion may include ceiling wall portions respectively provided on upper sides of the recessed portions in the seat-height direction when the seat cushion is in the tip-up state, and each of the ceiling wall portions may face the handgrip housed in a corresponding one of the recessed portions.

With the above configuration of the vehicle seat, it is possible to prevent the wheelchair from being displaced in the seat-height direction due to an inertial force in the event of a vehicle front-end collision, because the ceiling wall portion is located above, in the seat-height direction, the handgrip of the wheelchair fixed to the seat cushion in the tip-up state.

In the first aspect, the vehicle seat may further include a side airbag device provided in an end portion of the seat cushion in the seat-width direction, and configured to be deployed on the rear surface-side.

In the vehicle seat having the above configuration, the seat cushion is provided with the side airbag device for a wheelchair occupant. With this configuration of the vehicle seat, an injury value of the wheelchair occupant can be reduced.

In the above configuration, an operation of the side airbag device may be prohibited in any state other than the tip-up state.

With the above configuration of the vehicle seat, it is possible to prevent the side airbag device from being unnecessarily operated in any state of the seat cushion other than the tip-up state.

In the first aspect, the seat cushion may be configured such that a headrest is attachable to an upper portion of the seat cushion in the seat-height direction when the seat cushion is in the tip-up state.

The seat cushion of the vehicle seat having the above configuration is provided with the headrest for a wheelchair occupant. Thus, it is possible to improve the comfort of a wheelchair occupant and to reduce damage to the neck of the occupant in the event of a vehicle rear-end collision.

In the first aspect, the wheelchair fixing device may include a pair of fixing webbings, a pair of fixing hooks, and a pair of fixing retractors. The fixing webbings extend from portions of the rear surface of the seat cushion, and the portions are respectively on opposite sides, in the seat-width direction, of the wheelchair that is fixed to the seat cushion such that the rear side of the wheelchair faces the rear surface of the seat cushion in the tip-up state. The fixing hooks are respectively provided at distal ends of the fixing webbings. The fixing hooks are configured to lock the wheelchair. Each of the fixing retractors is switchable between an unlocked state where extension and retraction of a corresponding one of the fixing webbings are allowed and a locked state where only retraction of the corresponding one of the fixing webbings is allowed.

The wheelchair fixing device of the vehicle seat having the above configuration includes the fixing retractors each of which is switchable between the unlocked state and the locked state. Thus, a wheelchair occupant can easily fix the wheelchair by pushing the wheelchair against the seat cushion in the tip-up state, locking the wheelchair with the fixing hooks in the unlocked state, and then switching the state from the unlocked state to the locked state. Because the fixing hooks of the wheelchair fixing device are used to fix a wheelchair, the wheelchair fixing device can be used to fix various kinds of wheelchairs.

A second aspect of the disclosure relates to a vehicle seat arrangement structure including the vehicle seat according to the first aspect, and a rear seat. The vehicle seat is a front seat provided so as to face rearward in the vehicle front-rear direction and including the seat cushion to which a wheelchair is fixed so as to face rearward in the vehicle front-rear direction. The rear seat is provided so as to face forward in the vehicle front-rear direction. The rear seat faces the vehicle seat.

With the vehicle seat arrangement structure of the second aspect, a wheelchair occupant and an ordinary occupant (e.g., a helper) can sit vis-a-vis.

According to the foregoing aspects of the disclosure, in a vehicle configured to allow a wheelchair occupant seated in a wheelchair to get thereon, the wheelchair occupant can fix the wheelchair by himself/herself.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a side view of a vehicle seat according to a fourth embodiment, illustrating a state where a wheelchair is fixed to the vehicle seat;

FIG. 10A is a sectional view of the vehicle seat according to the fourth embodiment taken along line A-A in FIG. 9, illustrating the state where the wheelchair is fixed to the vehicle seat;

FIG. 10B is a sectional view of the vehicle seat according to the fourth embodiment taken along line B-B in FIG. 9, illustrating the state where the wheelchair is fixed to the vehicle seat;

FIG. 19 is a side view of the vehicle seat according to the seventh embodiment, illustrating the state where the wheelchair is fixed to the vehicle seat;

FIG. 20A is an enlarged sectional view of the vehicle seat according to the seventh embodiment taken along line F-F in FIG. 19, illustrating an arrangement of fixing retractors;

FIG. 20B is an enlarged view of a region G in FIG. 20A;

DETAILED DESCRIPTION OF EMBODIMENTS

Hereinafter, a vehicle seat according to example embodiments will be described with reference to the accompanying drawings. Note that, an arrow FR illustrated in FIG. 1 indicates a vehicle front side and an arrow RH indicates a right side in the vehicle-width direction. In FIG. 2 and the subsequent drawings, an arrow FR indicates a seat front side, an arrow UP indicates a seat upper side, and an arrow RH indicates a right side in the seat-width direction. In the following description, "front" and "rear" denote "front" and "rear" in the seat front-rear direction, "upper" and "lower" denote "upper" and "lower" in the seat-height direction, and "right" and "left" denote "right" and "left" in the seat-width direction, unless otherwise stated.

First Embodiment

Configuration

Figure 1:
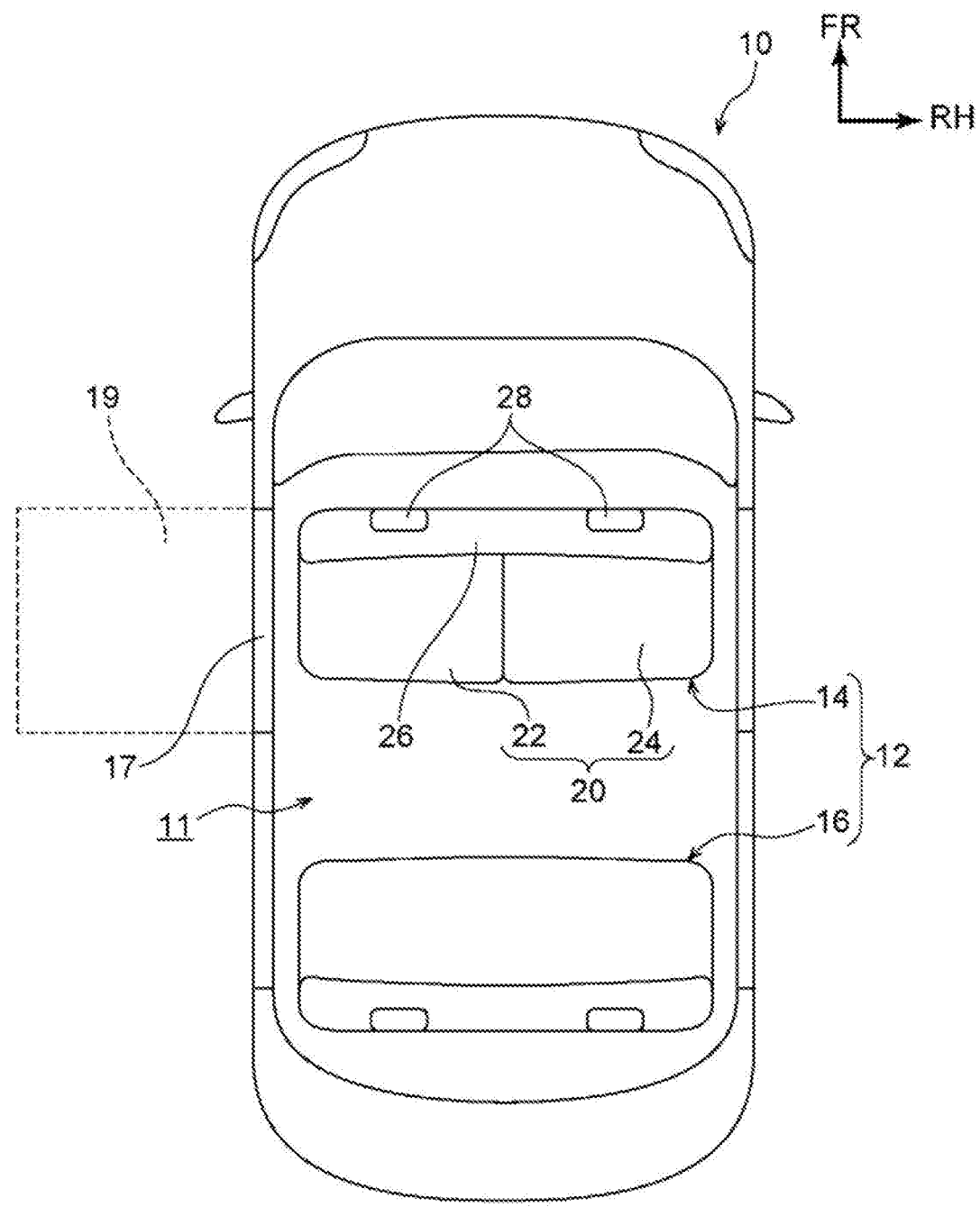
FIG. 1 is a plan view of a vehicle provided with a vehicle seat according to an embodiment, illustrating an arrangement of the vehicle seat.
Figure 2:
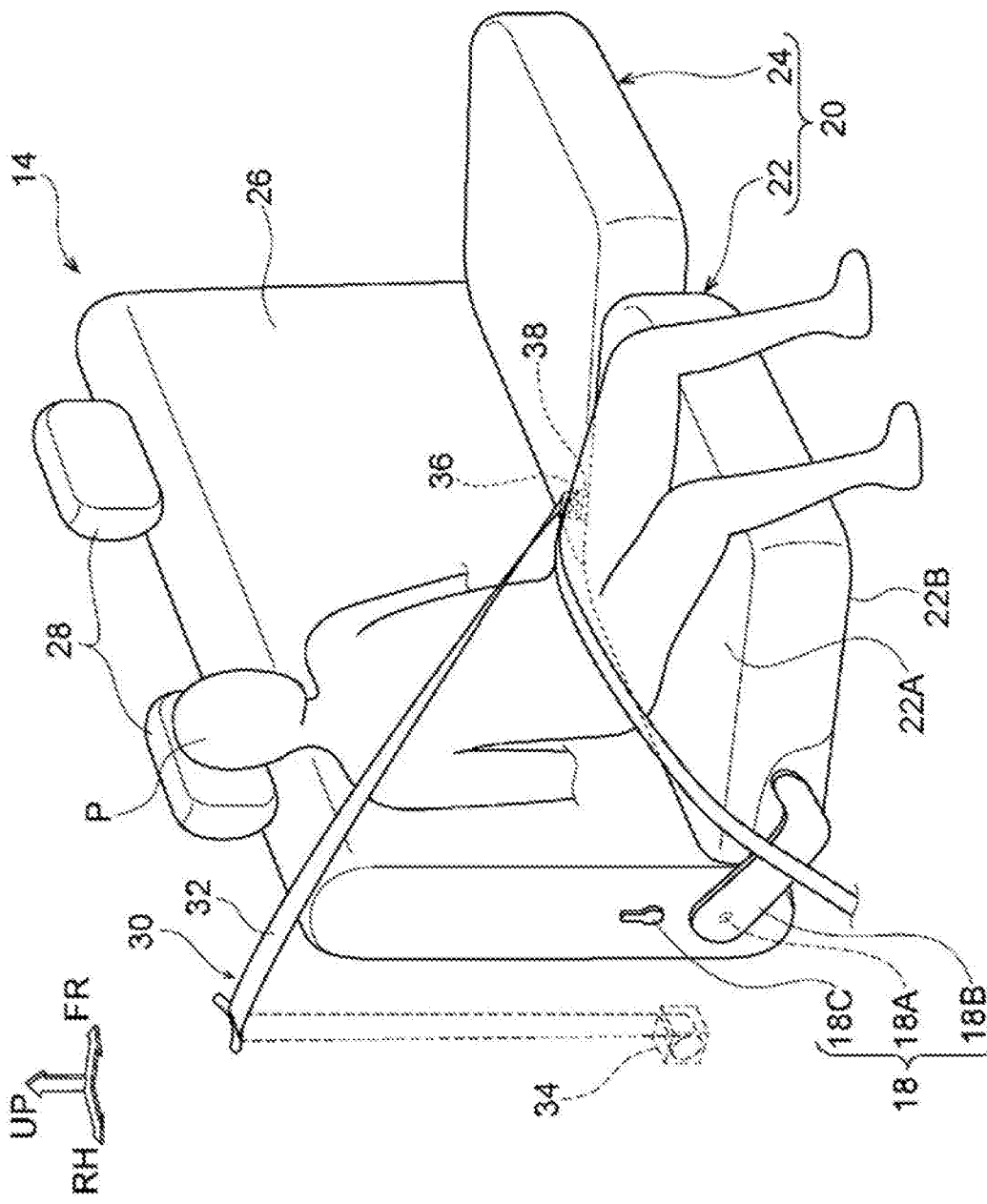
FIG. 2 is a perspective view of a vehicle seat according to a first embodiment, illustrating a normal state.

FIG. 1 illustrates a vehicle 10 to which a vehicle seat and a vehicle seat arrangement structure according to a first embodiment are applied. The vehicle 10 of the present embodiment is an autonomous vehicle and does not require a driver during autonomous driving. As illustrated in FIG. 1, the vehicle 10 includes, as a vehicle seat arrangement structure 12, a front seat 14 provided so as to face rearward in the vehicle front-rear direction and a rear seat 16 that is provided so as to face forward in the vehicle front-rear direction and that faces the front seat 14. In the present embodiment, when an ordinary occupant P (see FIG. 2) aboard the vehicle 10 is seated in the front seat 14, the seated ordinary occupant P faces the vehicle rear side. On the other hand, when the ordinary occupant P is seated in the rear seat 16, the seated ordinary occupant P faces the vehicle front side.

The vehicle 10 of the present embodiment is configured to allow a wheelchair occupant H (see FIG. 6) seated in a wheelchair 80 to get thereon while the wheelchair occupant H remains seated in the wheelchair 80. For example, the vehicle 10 is provided with a slope 19 (see FIG. 1) for boarding, which eliminates a level difference between a vehicle cabin 11 and a sidewalk or a roadway. The slope 19 can be stored under a floor of the vehicle cabin 11. In the present embodiment, when the wheelchair occupant H is aboard the vehicle 10, the wheelchair 80 can be fixed to the front seat 14. Note that, the ordinary occupant P denotes an ordinary occupant, such as a helper, seated in the front seat 14 or the rear seat 16, and is distinguished from the wheelchair occupant H. FIG. 1 indicates a side door 17.

As illustrated in FIG. 2, the front seat 14 is a bench seat, and includes a seat cushion 20, a seatback 26, and a headrest 28. The seat cushion 20 is configured to support the thighs and buttocks of the ordinary occupant P, thereby allowing the ordinary occupant P to be seated in the front seat 14. The seatback 26 is configured to support the back of the ordinary occupant P. The headrest 28 is attached to an upper end portion of the seatback 26, and is configured to support the head of the ordinary occupant P.

The seat cushion 20 includes a movable seat cushion 22 and a fixed seat cushion 24. The movable seat cushion 22 is disposed on the right side, and is configured to be tipped up so as to extend along the seatback 26. The fixed seat cushion 24 is disposed on the left side, and the angle of the fixed seat cushion 24 is fixed, so that the fixed seat cushion 24 is not configured to be tipped up. The seat cushion 20 is split into the movable seat cushion 22 and the fixed seat cushion 24 at a split ratio of 6:4. Each of the movable seat cushion 22 and the fixed seat cushion 24 of the seat cushion 20 includes a metallic frame, an elastic member provided on the frame, and an upholstery member made of cloth or leather and covering a surface of the elastic member. The elastic member is made of a material that can be compressed and deformed when a load is applied thereto. Examples of the material of the elastic member include foamed urethane. The movable seat cushion 22 can be switched, by a tip-up mechanism 18, between a normal state (see FIG. 2) where the angle of the movable seat cushion 22 is the same as that of the fixed seat cushion 24, and a tip-up state (see FIG. 3) where the movable seat cushion 22 has been tipped up so as to extend along the seatback 26.

The tip-up mechanism 18 includes a pair of right and left arm plates 18B, and a releasing lever 18C. The right and left arm plates 18B extend from a rear portion of the movable seat cushion 22 in the normal state toward a pivot shaft 18A provided in a lower portion of the seatback 26. The releasing lever 18C is configured to release the restriction on pivot motions of the arm plates 18B. The movable seat cushion 22 is switched from the normal state to the tip-up state when the ordinary occupant P or the wheelchair occupant H operates the releasing lever 18C and raises a distal end (a front end) of the movable seat cushion 22. On the other hand, the movable seat cushion 22 is switched from the tip-up state to the normal state when the ordinary occupant P or the wheelchair occupant H operates the releasing lever 18C and pushes down the distal end (the front end) of the movable seat cushion 22.

The front seat 14 is provided with a seatbelt device 30 for an ordinary occupant, which is a three-point seatbelt device for the ordinary occupant P. The seatbelt device 30 for an ordinary occupant includes a first webbing 32, a first retractor 34, a first tongue plate 36, and a first buckle 38. FIG. 2 illustrates only the seatbelt device 30 for an ordinary occupant provided at the right side of the front seat 14, but the same seatbelt device as the seatbelt device 30 for an ordinary occupant is provided at the left side of the front seat 14.

The first webbing 32 is a belt that restrains the ordinary occupant P. One end of the first webbing 32 is retracted into the first retractor 34 such that the first webbing 32 is extendable, and the other end thereof is fixed to a pillar or a floor via an anchor. The first retractor 34 is a so-called emergency locking retractor (ELR) configured to prevent the first webbing 32 from being extended (unreeled) in the event of a collision or sudden braking. The first retractor 34 is fixed to a vehicle body, such as a pillar. The first tongue plate 36 is provided on the first webbing 32 so as to be slidable on the first webbing 32. The first buckle 38 is provided on the opposite side of the movable seat cushion 22 from the first retractor 34 in the seat-width direction, and the first tongue plate 36 is engageable with the first buckle.

Figure 3:
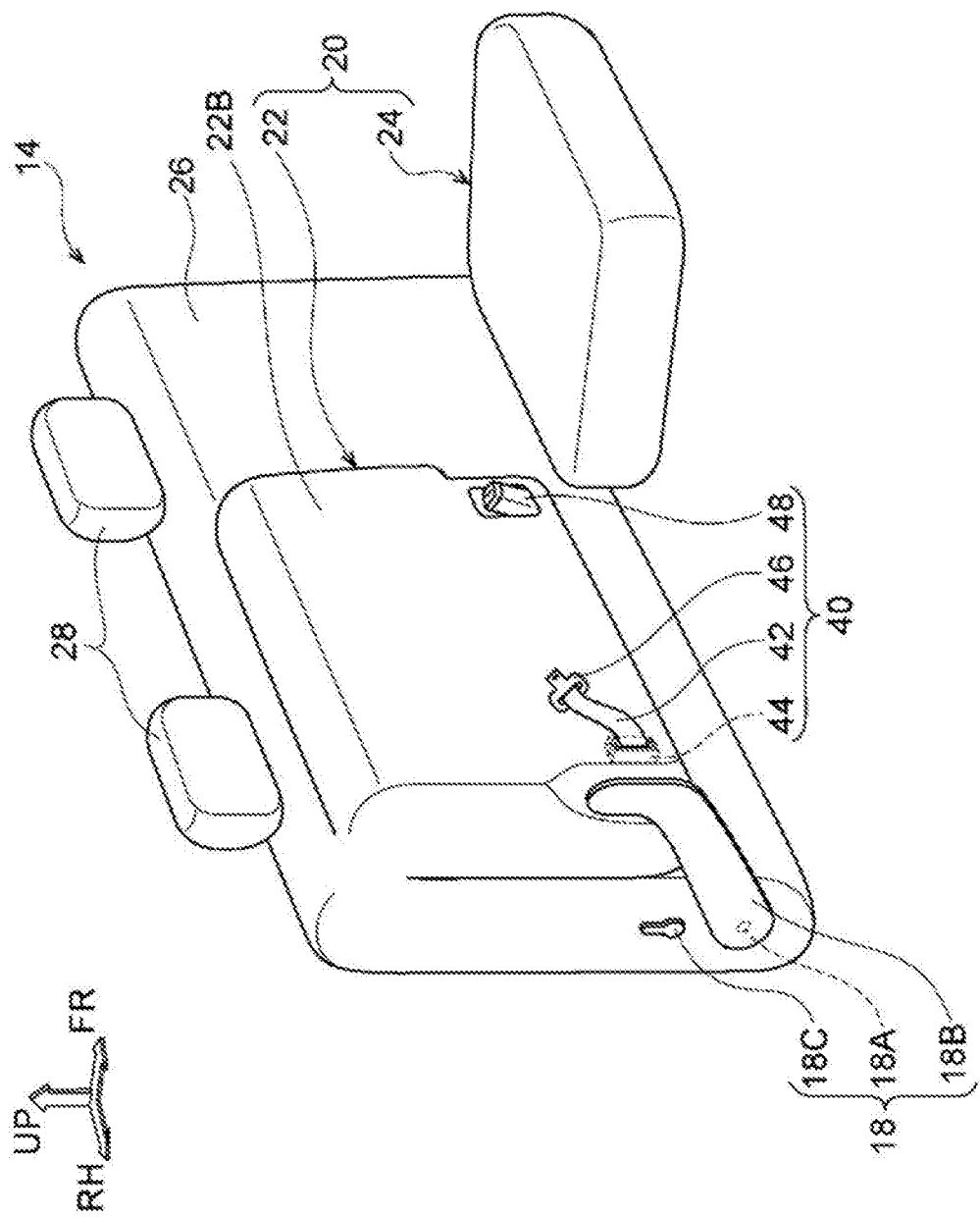
FIG. 3 is a perspective view of the vehicle seat according to the first embodiment, illustrating a tip-up state of a seat cushion.

The movable seat cushion 22 includes a seating surface 22A and a rear surface 22B that is on the opposite side of the movable seat cushion 22 from the seating surface 22A. As illustrated in FIG. 3, a wheelchair fixing device 40 configured to fix the wheelchair 80 is provided on the rear surface 22B-side, at a position in a lower portion of the movable seat cushion 22 in the tip-up state. The wheelchair fixing device 40 of the present embodiment is a two-point seatbelt device, and includes a restraining webbing 42, a restraining retractor 44, a restraining tongue plate 46, and a restraining buckle 48.

The restraining webbing 42 is a belt that restrains the wheelchair 80. One end of the restraining webbing 42 is retracted into the restraining retractor 44 such that the restraining webbing 42 is extendable, and the restraining tongue plate 46 is fixed to the other end of the restraining webbing 42. The restraining retractor 44 is a so-called automatic locking retractor (ALR) including an automatic locking mechanism configured to lock extension of the restraining webbing 42.

The restraining retractor 44 is switched from a free state to a restrainable state when the restraining webbing 42 is extended by a predetermined amount. The restraining retractor 44 in the restrainable state allows only retraction of the restraining webbing 42 and prohibits extension of the restraining webbing 42. The restraining retractor 44 returns from the restrainable state to the free state when the restraining webbing 42 is almost entirely retracted. The restraining retractor 44 in the free state allows extension and retraction of the restraining webbing 42. The restraining retractor 44 of the present embodiment is housed in a right-side portion of the movable seat cushion 22. Thus, when the restraining webbing 42 has been retracted in the restraining retractor 44, the restraining tongue plate 46 is exposed on the right-side portion of the movable seat cushion 22.

The restraining tongue plate 46 of the present embodiment has a shape different from that of the first tongue plate 36 of the seatbelt device 30 for an ordinary occupant. That is, the restraining tongue plate 46 is engageable only with the restraining buckle 48.

The restraining buckle 48 is provided so as to be exposed on a left-side portion of the movable seat cushion 22. The restraining tongue plate 46 is engageable with the restraining buckle 48.

Operations

Next, operations of the present embodiment will be described along with a procedure by which the wheelchair occupant H gets aboard the vehicle 10.

First, the wheelchair occupant H seated in the wheelchair 80 opens the side door 17 of the vehicle 10 by operating a door handle (not illustrated) or an opening-closing switch (not illustrated). Then, the wheelchair occupant H operates an activation switch, so that the slope 19 is drawn out from under the floor of the vehicle cabin 11. As a result, the wheelchair occupant H can enter the vehicle cabin 11 through the slope 19. At the time of entering the vehicle cabin 11, the wheelchair occupant H operates the releasing lever 18C to switch the movable seat cushion 22 from the normal state to the tip-up state. Then, the wheelchair occupant H turns the wheelchair 80 such that the wheelchair 80 faces rearward in the vehicle front-rear direction and the wheelchair 80 is disposed with its back against the movable seat cushion 22, and the wheelchair occupant H parks the wheelchair 80 between the restraining tongue plate 46 and the restraining buckle 48 in the seat-width direction.

Figure 4:
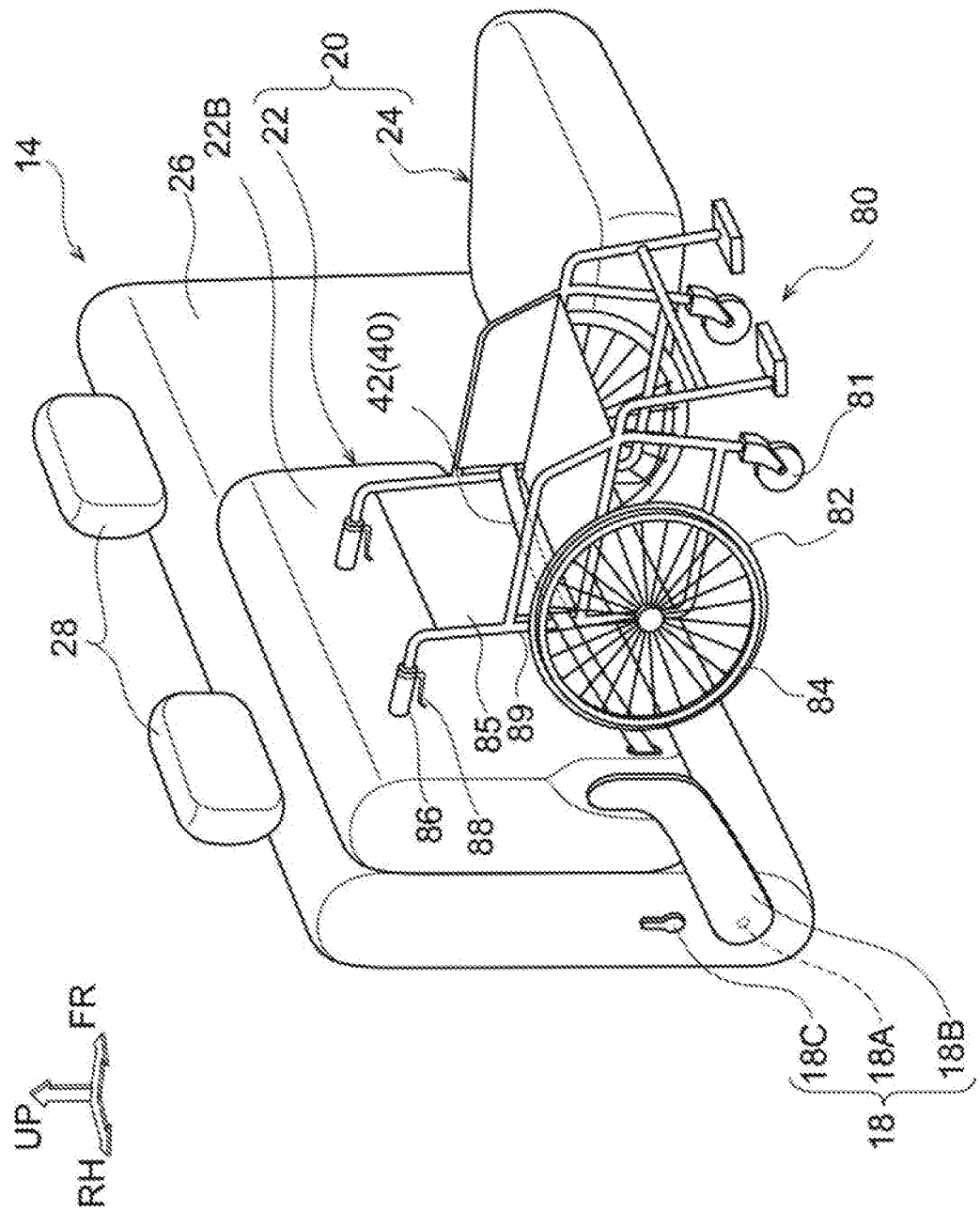
FIG. 4 is a perspective view of the vehicle seat according to the first embodiment, illustrating a state where a wheelchair is fixed to the vehicle seat.

Next, the wheelchair occupant H stretches out his/her hand to the right side of the wheelchair 80 and holds the restraining tongue plate 46 in his/her hand. Then, the wheelchair occupant H pulls the restraining tongue plate 46 from the right side of the wheelchair 80 to the left side thereof through the front side of a backrest 85 (see FIG. 4). As a result, as illustrated in FIG. 4, the restraining webbing 42 is disposed on a front surface of the backrest 85 so as to extend from the right side to the left side of the backrest 85.

After the wheelchair occupant H inserts the restraining tongue plate 46 into the restraining buckle 48 to engage the restraining tongue plate 46 with the restraining buckle 48 on the left side of the wheelchair 80, the wheelchair occupant H extends the restraining webbing 42 by at least a predetermined amount to switch the restraining retractor 44 from the free state to the restrainable state. Then, the wheelchair occupant H causes the wheelchair 80 to be restrained by the front seat 14, by causing the restraining webbing 42 to be retracted into the restraining retractor 44 while pushing the wheelchair 80 against the rear surface 22B of the movable seat cushion 22.

Outline of First Embodiment

As described above, the front seat 14 of the present embodiment includes the wheelchair fixing device 40 configured to fix the wheelchair 80 to the movable seat cushion 22 that is switchable to the tip-up state. The wheelchair fixing device 40 is disposed on the rear surface 22B-side of the movable seat cushion 22, and can be operated by the wheelchair occupant H when the movable seat cushion 22 is in the tip-up state. Therefore, according to the present embodiment, the wheelchair occupant H can fix the wheelchair 80 by himself/herself in the vehicle 10 that is configured to allow the wheelchair occupant H seated in the wheelchair 80 to get thereon.

In the present embodiment, the wheelchair 80 is restrained by the movable seat cushion 22 including the elastic member while being pushed against the movable seat cushion 22. Thus, displacement of the wheelchair 80 that has been fixed is prevented.

The wheelchair fixing device 40 of the present embodiment is a two-point seatbelt device including the restraining retractor 44 that is an ALR. The wheelchair 80 is fixed with the use of the wheelchair fixing device 40 in the following manner. The wheelchair occupant H pushes the wheelchair 80 against the movable seat cushion 22 in the tip-up state and engages the restraining tongue plate 46 with the restraining buckle 48, and then switches the restraining retractor 44 from the free state to the restrainable state by operating the automatic locking mechanism. In this way, the wheelchair occupant H can easily fix the wheelchair 80. Because the restraining webbing 42 of the wheelchair fixing device 40 is used to fix the wheelchair 80, the wheelchair fixing device 40 can be used to fix various kinds of wheelchairs 80 that differ in size and shape.

In the front seat 14 of the present embodiment, the restraining tongue plate 46 and the restraining buckle 48 are exposed on the rear surface 22B of the movable seat cushion 22 in the tip-up state. Thus, the wheelchair occupant H can easily pull the restraining tongue plate 46 such that the restraining tongue plate 46 approaches the restraining buckle 48. The front seat 14 of the present embodiment is configured to allow the wheelchair occupant H to easily perform an operation for fixing the wheelchair 80 while the wheelchair occupant H remains seated in the wheelchair 80.

With the vehicle seat arrangement structure 12 including the front seat 14 and the rear seat 16 facing the front seat 14, the wheelchair occupant H and the ordinary occupant P (e.g., a helper) can sit vis-a-vis. Further, a foot space can be shared by the front seat 14 and the rear seat 16. Therefore, a vehicle interior space can be efficiently utilized.

Second Embodiment

In a second embodiment, a configuration relating to a seatbelt for restraining the wheelchair occupant H is added to the configuration of the first embodiment. Hereinafter, the differences from the first embodiment will be described. Note that, the same configurations as those in the first embodiment will be denoted by the same reference signs as those in the first embodiment, and detailed description thereof will be omitted.

Figure 5:
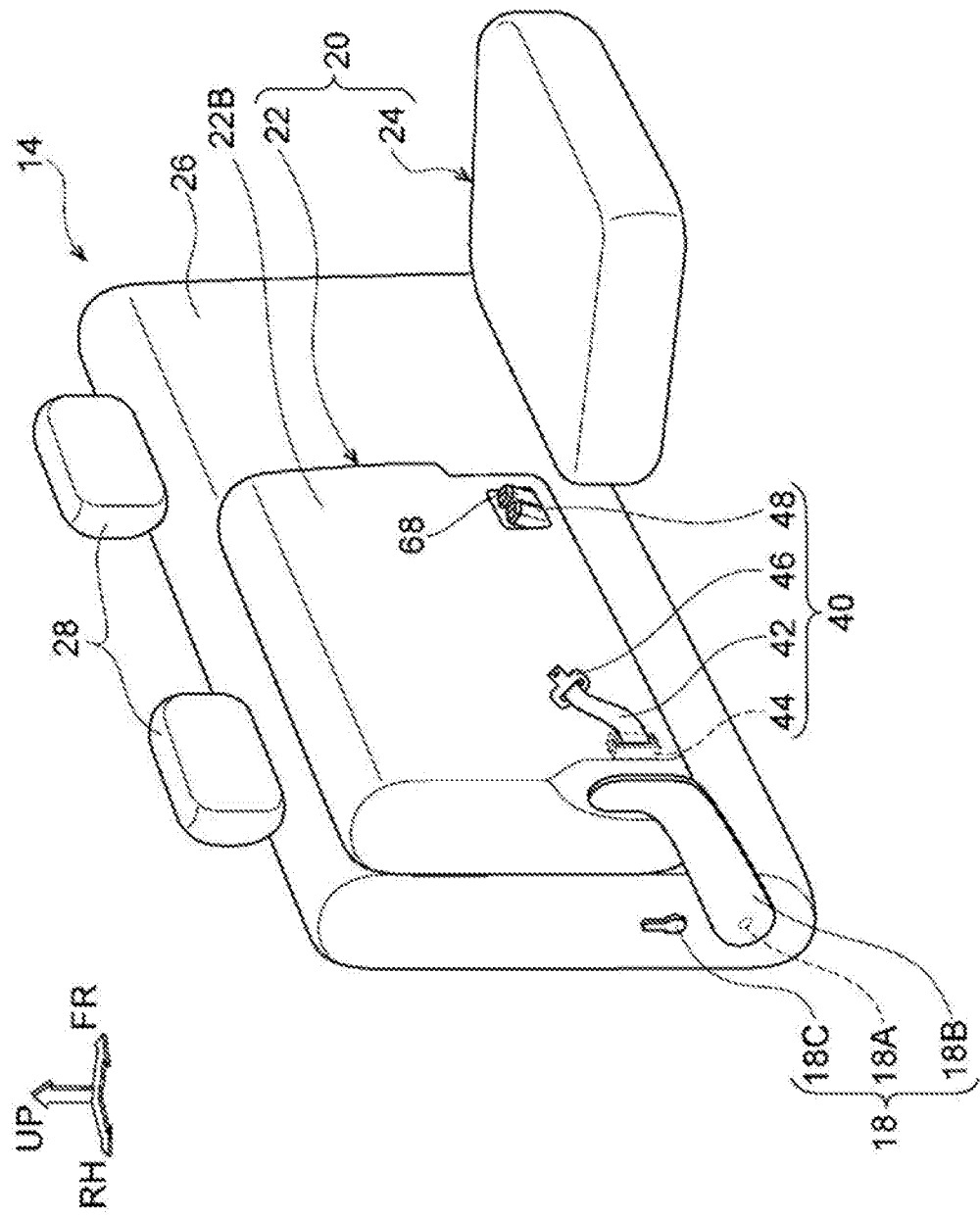
FIG. 5 is a perspective view of a vehicle seat according to a second embodiment, illustrating a tip-up state of a seat cushion.

As illustrated in FIG. 5, the movable seat cushion 22 of the present embodiment includes a second buckle 68 that is an example of an additional buckle for a wheelchair occupant and that is provided on the rear surface 22B-side, at a position adjacent to the restraining buckle 48. The second buckle 68 of the present embodiment has an appearance similar to that of the restraining buckle 48, and is provided adjacent to and to the left of the restraining buckle 48.

The second buckle 68 has the same design as that of the first buckle 38 of the seatbelt device 30 for an ordinary occupant, and the first tongue plate 36 is engageable with the second buckle 68. That is, the first tongue plate 36 is an example of a shared tongue plate that is shared by the first buckle 38 and the second buckle 68.

In the present embodiment, the first buckle 38 is provided on the seating surface 22A of the movable seat cushion 22 (see FIG. 2), and the first buckle 38 is hidden between the movable seat cushion 22 and the seatback 26 by placing the movable seat cushion 22 in the tip-up state. On the other hand, when the movable seat cushion 22 is placed in the tip-up state, the second buckle 68 appears.

Figure 6:
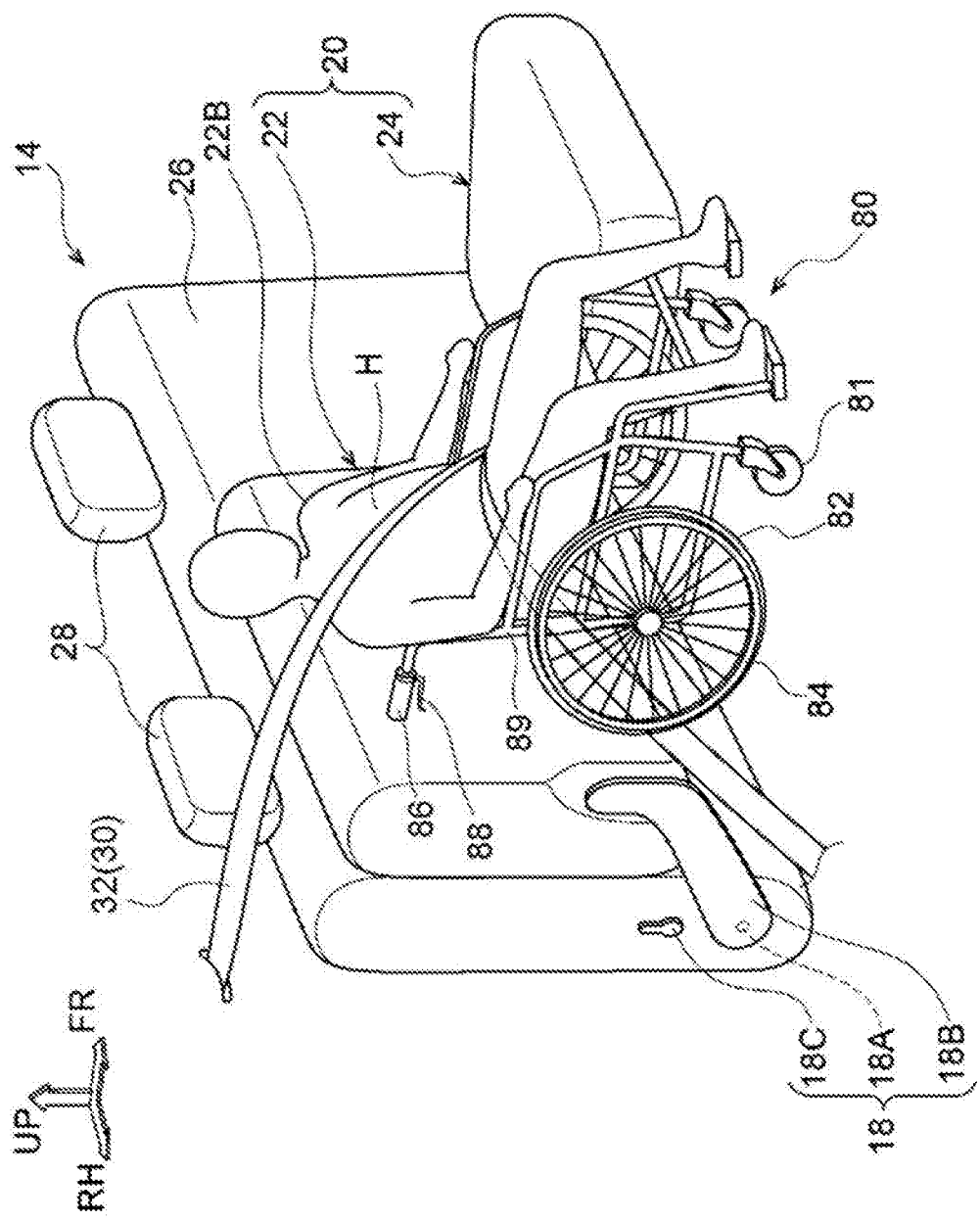
FIG. 6 is a perspective view of the vehicle seat according to the second embodiment, illustrating a state where a wheelchair occupant is seated in a wheelchair with the wheelchair fixed to the vehicle seat.

According to the present embodiment described above, the second buckle 68 can be used even when the first buckle 38 cannot be used. For that reason, as illustrated in FIG. 6, the wheelchair occupant H can use the seatbelt device 30 for an ordinary occupant even when the movable seat cushion 22 is placed in the tip-up state.

According to the present embodiment, both the ordinary occupant P and the wheelchair occupant H can use the seatbelt device 30 for an ordinary occupant, and the wheelchair occupant H can wear the seatbelt by himself/herself. In addition, the present embodiment produces the same advantageous effects as those of the first embodiment.

Third Embodiment

In a third embodiment, a seatbelt device dedicated for the wheelchair occupant H is added to the configuration of the second embodiment. Hereinafter, the differences from the second embodiment will be described. Note that, the same configurations as those in the first and second embodiments will be denoted by the same reference signs as those in the first and second embodiments, and detailed description thereof will be omitted.

Figure 7:
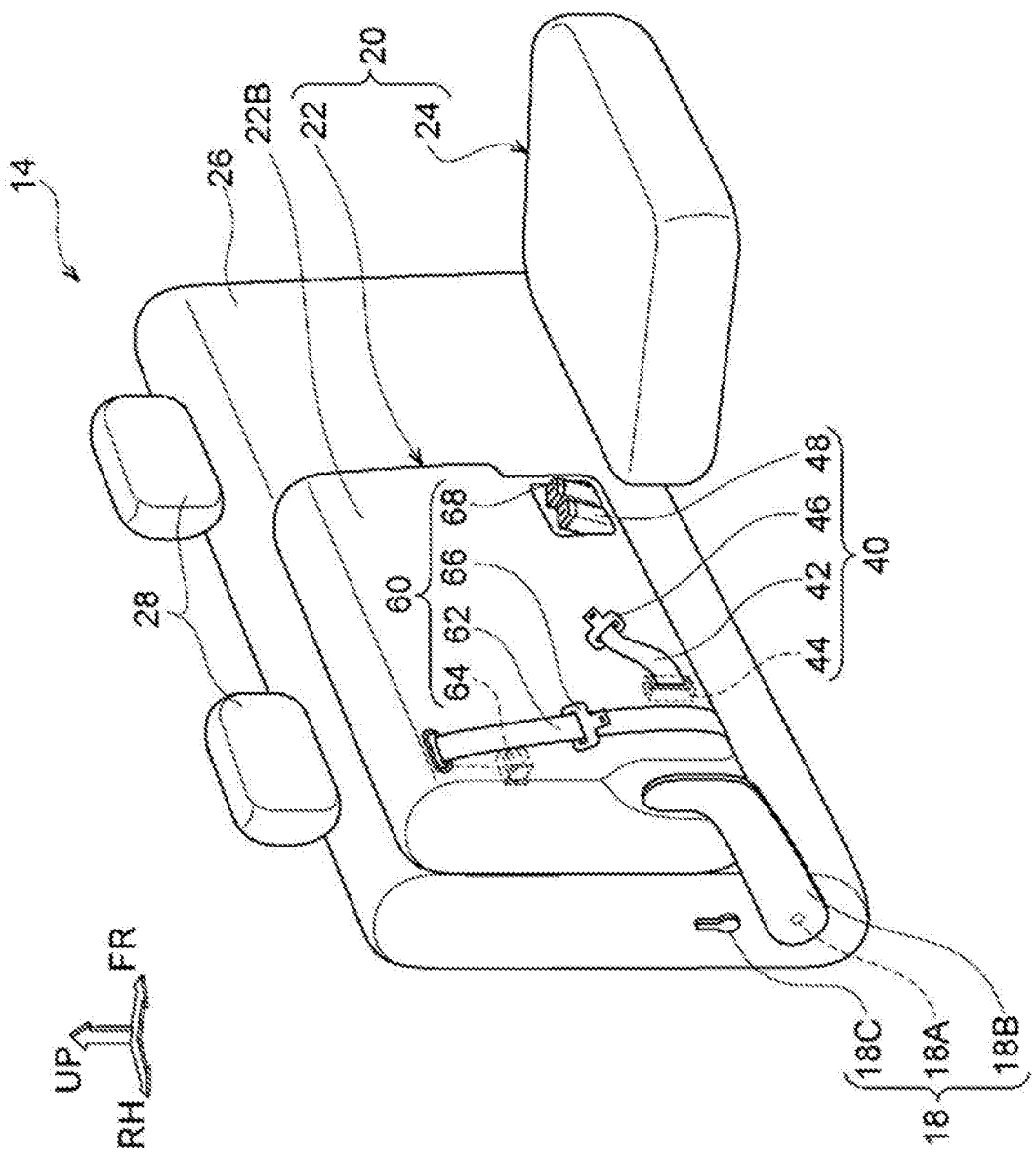
FIG. 7 is a perspective view of a vehicle seat according to a third embodiment, illustrating a tip-up state of a seat cushion.

As illustrated in FIG. 7, the movable seat cushion 22 of the present embodiment includes a seatbelt device 60 for a wheelchair occupant, which includes the second buckle 68 and is provided on the rear surface 22B-side. The seatbelt device 60 for a wheelchair occupant according to the present embodiment includes a second webbing 62, a second retractor 64, a second tongue plate 66, and the second buckle 68. The second webbing 62 is an example of an additional webbing, the second retractor 64 is an example of an additional retractor, the second tongue plate 66 is an example of an additional tongue plate, and the second buckle 68 is an example of an additional buckle.

The second webbing 62 and the second retractor 64 are provided in a right-side portion (the restraining webbing 42-side portion) of the movable seat cushion 22, at positions adjacent to and to the right of the restraining webbing 42 and the restraining retractor 44. The second webbing 62 is a belt that restrains the wheelchair occupant H. One end of the second webbing 62 is retracted into the second retractor 64 such that the second webbing 62 is extendable, and the other end thereof is fixed to the lower end of the movable seat cushion 22 in the tip-up state.

The second retractor 64 is a so-called emergency locking retractor (ELR) configured to prevent the second webbing 62 from being extended (unreeled) in the event of a collision or sudden braking. The second retractor 64 is fixed to a frame or the like of the movable seat cushion 22, at a position inside an upper portion of the movable seat cushion 22 in the tip-up state. The second tongue plate 66 is provided on the second webbing 62 so as to be slidable on the second webbing 62. The second buckle 68 is provided in a left-side portion of the movable seat cushion 22, and the second tongue plate 66 is engageable with the second buckle 68.

The second tongue plate 66 of the present embodiment has a shape different from the shape of the first tongue plate 36 of the seatbelt device 30 for an ordinary occupant and the shape of the restraining tongue plate 46 of the wheelchair fixing device 40. That is, the second tongue plate 66 is engageable only with the second buckle 68.

Figure 8:
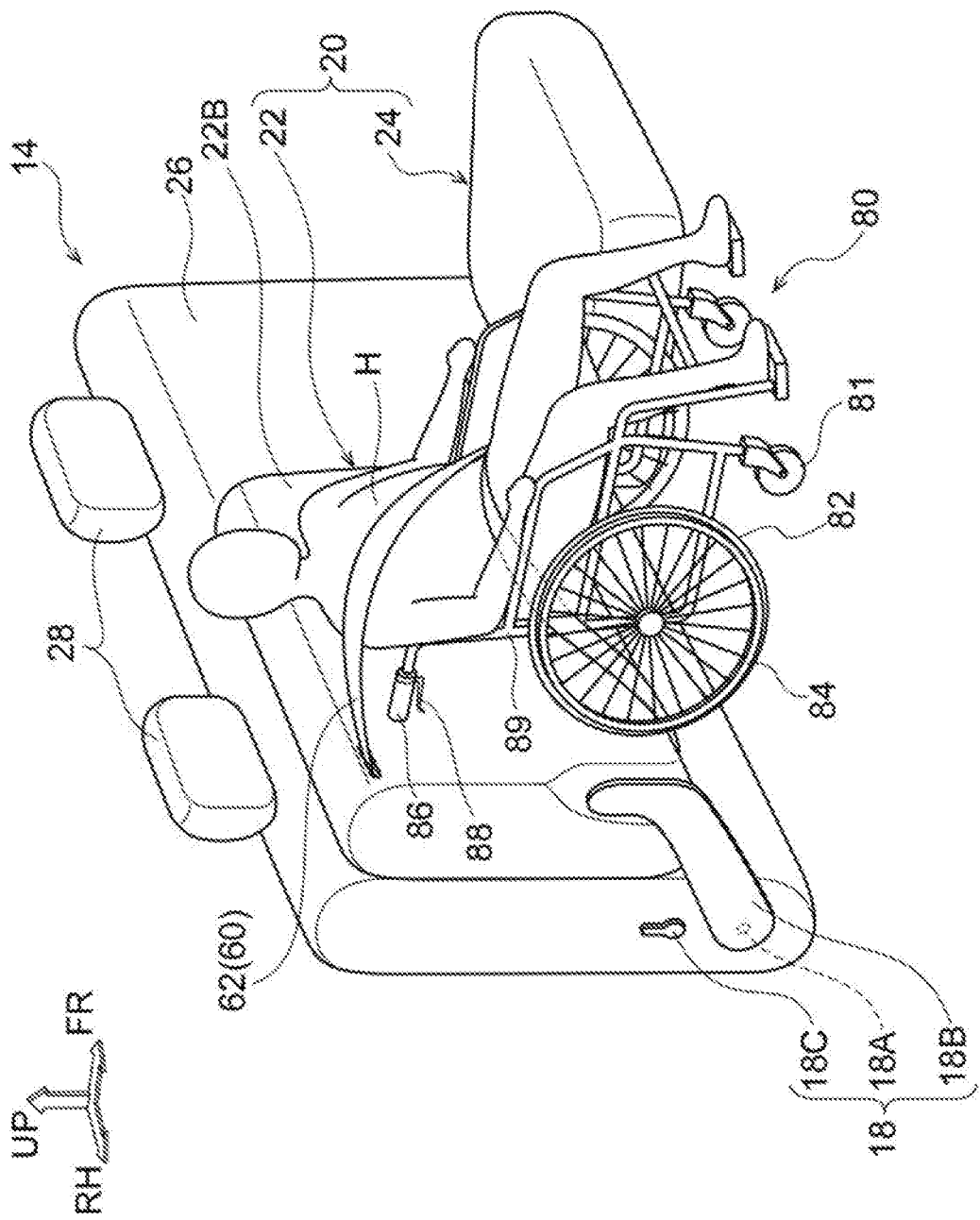
FIG. 8 is a perspective view of the vehicle seat according to the third embodiment, illustrating a state where a wheelchair occupant is seated in a wheelchair with the wheelchair fixed to the vehicle seat.

In the present embodiment described above, the movable seat cushion 22 is provided with the seatbelt device 60 for the wheelchair occupant H, which can be used when the movable seat cushion 22 is in the tip-up state. The wheelchair occupant H (see FIG. 8) seated in the wheelchair 80 and the ordinary occupant P (see FIG. 2) seated in the movable seat cushion 22 have different hip points. For this reason, when the seatbelt device 30 for an ordinary occupant is shared by the ordinary occupant P and the wheelchair occupant H, there may be a case where the seatbelt does not appropriately fit the wheelchair occupant H due to a difference in hip point between the wheelchair occupant H and the ordinary occupant P.

In contrast to this, according to the present embodiment, because the seatbelt device 60 for the wheelchair occupant H is provided, it is possible to prevent occurrence of a situation where the seatbelt does not appropriately fit the wheelchair occupant H. Further, according to the present embodiment, it is possible to cause the seatbelt to comfortably fit the wheelchair occupant H by optimizing the position of the seatbelt device 60 for a wheelchair occupant based on the hip point of the wheelchair occupant H. In addition, the present embodiment produces the same advantageous effects as those of the first embodiment.

Fourth Embodiment

In the first embodiment, the rear surface 22B of the movable seat cushion 22 is flat. In contrast to this, in a fourth embodiment, a recess is provided in the rear surface 22B of the movable seat cushion 22. Hereinafter, the differences from the first embodiment will be described. Note that, the same configurations as those in the first embodiment will be denoted by the same reference signs as those in the first embodiment, and detailed description thereof will be omitted.

As illustrated in FIG. 9, FIG. 10A, and FIG. 10B, the movable seat cushion 22 of the present embodiment includes a pair of right and left recessed portions 23 provided in the rear surface 22B and recessed toward the seating surface 22A. As illustrated in FIG. 9, each recessed portion 23 extends in the seat-height direction (the up-down direction) from an upper portion to a lower end of the movable seat cushion 22 in the tip-up state. At an upper-side starting point of each recessed portion 23, there is provided a ceiling wall portion 23A that extends obliquely upward as the ceiling wall portion 23A extends forward from the bottom surface of the recessed portion 23.

The right and left recessed portions 23 of the present embodiment are configured such that right and left wheels 82, right and left hand rims 84, right and left handgrips 86, and right and left brake levers 88 of the wheelchair 80 can be respectively housed therein. The wheels 82 are rear wheels of the wheelchair 80, and the hand rims 84 are provided outward of the wheels 82 in the seat-width direction. The handgrips 86 are grips for a helper, which extend rearward from an upper end of the wheelchair 80, and the brake levers 88 are operation levers which extend downward and rearward from the handgrips 86.

As the width of the recessed portion 23 of the present embodiment, at least the same width as the sum of the width of the wheel 82 and the width of the hand rim 84 is enough. However, as illustrated in FIG. 10A, the width of the recessed portion 23 is set to be wider than the sum of the width of the wheel 82 and the width of the hand rim 84 such that various kinds of wheelchairs having different sizes can be fixed. For example, the width of the recessed portion 23 is increased inward in the seat-width direction such that a wheelchair having an axle track (i.e., the distance between the wheels 82) less than that of a standard-sized wheelchair can be fixed. Further, the width of the recessed portion 23 is increased outward in the seat-width direction such that a wheelchair having an axle track (i.e., the distance between the wheels 82) greater than that of a standard-sized wheelchair can be fixed.

The wheel 82 and the hand rim 84 are housed in the recessed portion 23, at positions close to the lower end of the recessed portion 23. As illustrated in FIG. 10B, the handgrip 86 and the brake lever 88 are housed in the recessed portion 23, at positions close to the upper end of the recessed portion 23. In this case, the handgrip 86 faces the ceiling wall portion 23A in the seat-height direction (the up-down direction).

Because the recessed portions 23 are provided, the present embodiment produces the following advantageous effects in addition to the advantageous effects of the first embodiment. That is, with the configuration of the front seat 14 according to the present embodiment, at least the wheels 82 and the handgrips 86 of the wheelchair 80 are housed in the recessed portions 23 provided in the rear surface 22B of the movable seat cushion 22. Thus, the wheelchair 80 can be fixed to the movable seat cushion 22, at a position that is rearward, in the seat front-rear direction, of a position at which the wheelchair 80 is fixed to the movable seat cushion 22 having no recessed portions 23. As a result, displacement of the wheelchair 80 in the seat-lateral direction can be reduced as compared with a case where the movable seat cushion 22 has no recessed portions 23.

With the configuration of the front seat 14 of the present embodiment, the wheelchair 80 is fixed at a further rearward position and thus the wheelchair occupant H can be seated at a further rearward position. Thus, the usability of the seatbelt device 30 for an ordinary occupant is improved for the wheelchair occupant H. Further, the space of the vehicle cabin 11 can be efficiently utilized because the wheelchair 80 is fixed at a further rearward position.

With the configuration of the front seat 14 of the present embodiment, the ceiling wall portions 23A are located above the handgrips 86 of the wheelchair 80 fixed to the movable seat cushion 22. In the event of a front-end collision of the vehicle 10 in which the front seat 14 is disposed so as to face rearward as in the present embodiment, the relative speed is high and the wheelchair 80 and the wheelchair occupant H are displaced upward along the movable seat cushion 22 due to an inertial force. With the configuration of the front seat 14 of the present embodiment, because the ceiling wall portions 23A are located above the handgrips 86, it is possible to reduce upward displacement of the wheelchair 80 due to an inertial force in the event of a front-end collision, as compared with a case where the movable seat cushion 22 has no ceiling wall portions 23A.

In the present embodiment, the movable seat cushion 22 includes a pair of the right and left recessed portions 23. However, the configuration of the recessed portion 23 is not limited to this. For example, the right and left recessed portions 23 may be integrated into a single recessed portion. That is, a single recessed portion in which the right and left wheels 82, the right and left hand rims 84, the right and left handgrips 86, and the right and left brake levers 88 are all housed may be provided at the center of the movable seat cushion 22 in the seat-width direction.

Fifth Embodiment

In a fifth embodiment, a side airbag device for the wheelchair occupant H is added to the configuration of the fourth embodiment. Hereinafter, the differences from the fourth embodiment will be described. Note that, the same configurations as those in the first and fourth embodiments will be denoted by the same reference signs as those in the first and fourth embodiments, and detailed description thereof will be omitted.

Figure 12:
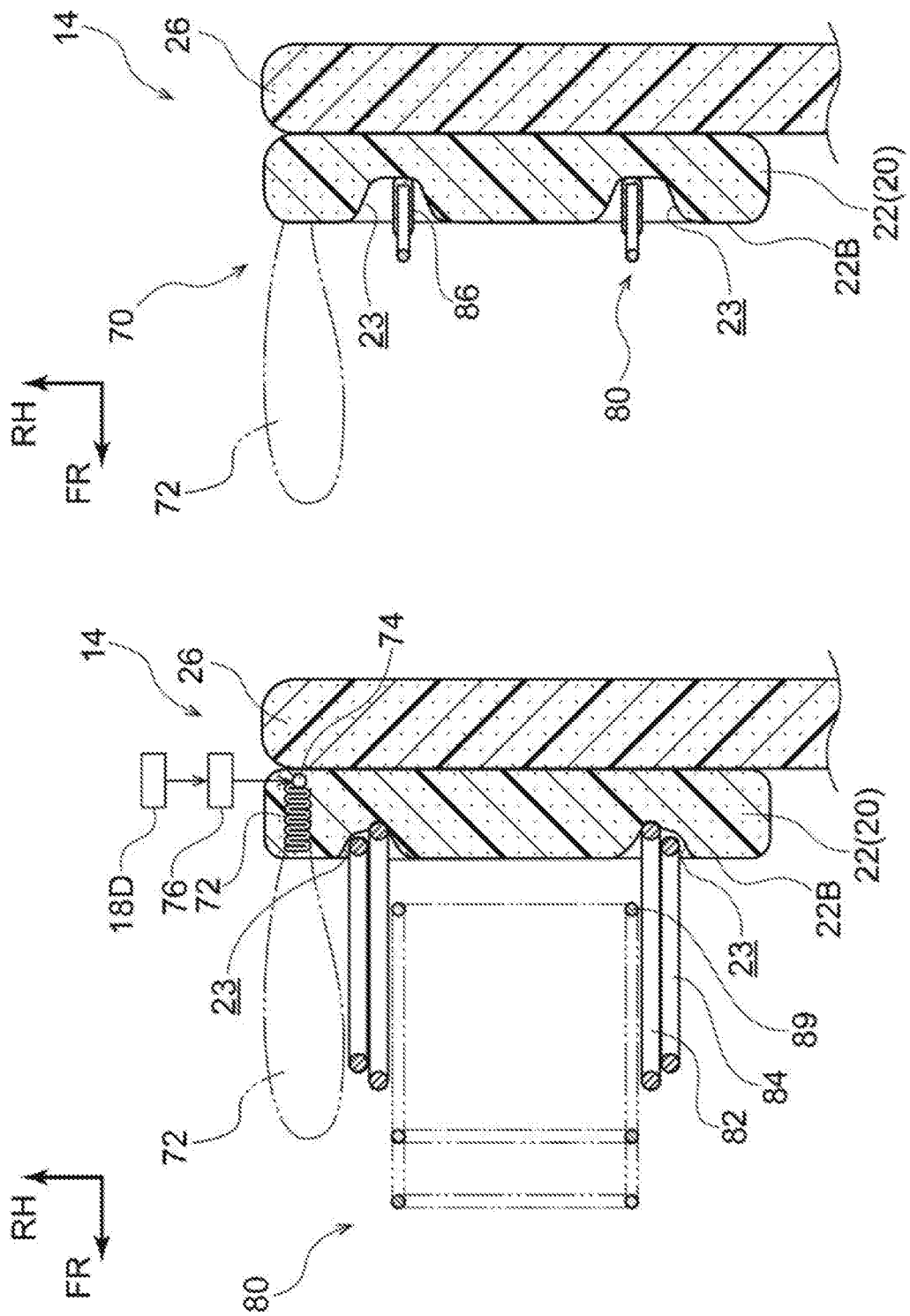
FIG. 12A is a sectional view of the vehicle seat according to the fifth embodiment taken along line C-C in FIG. 11, illustrating the state where the side airbag is deployed.
FIG. 12B is a sectional view of the vehicle seat according to the fifth embodiment taken along line D-D in FIG. 11, illustrating the state where the side airbag is deployed.

As illustrated in FIG. 12A and FIG. 12B, a side airbag device 70 of the present embodiment is built in a right end portion of the movable seat cushion 22, which is an outer portion of the movable seat cushion 22 in the vehicle-width direction and which is located outward of the recessed portion 23 in the seat-width direction. The side airbag device 70 includes an airbag 72 having a bag shape and housed in a folded state, an inflator 74 configured to supply gas into the airbag 72, and a controller 76 configured to control an operation of the inflator 74.

The controller 76 includes an electronic control unit (ECU) and an acceleration sensor, which are not illustrated in the drawings. The ECU is a microcomputer including a central processing unit (CPU), a read-only memory (ROM), a random-access memory (RAM), and so forth. The ROM stores a program for controlling the operation of the side airbag device 70. The CPU retrieves the program and executes the program by using the RAM as a workspace, so that various processes are executed.

Figure 11:
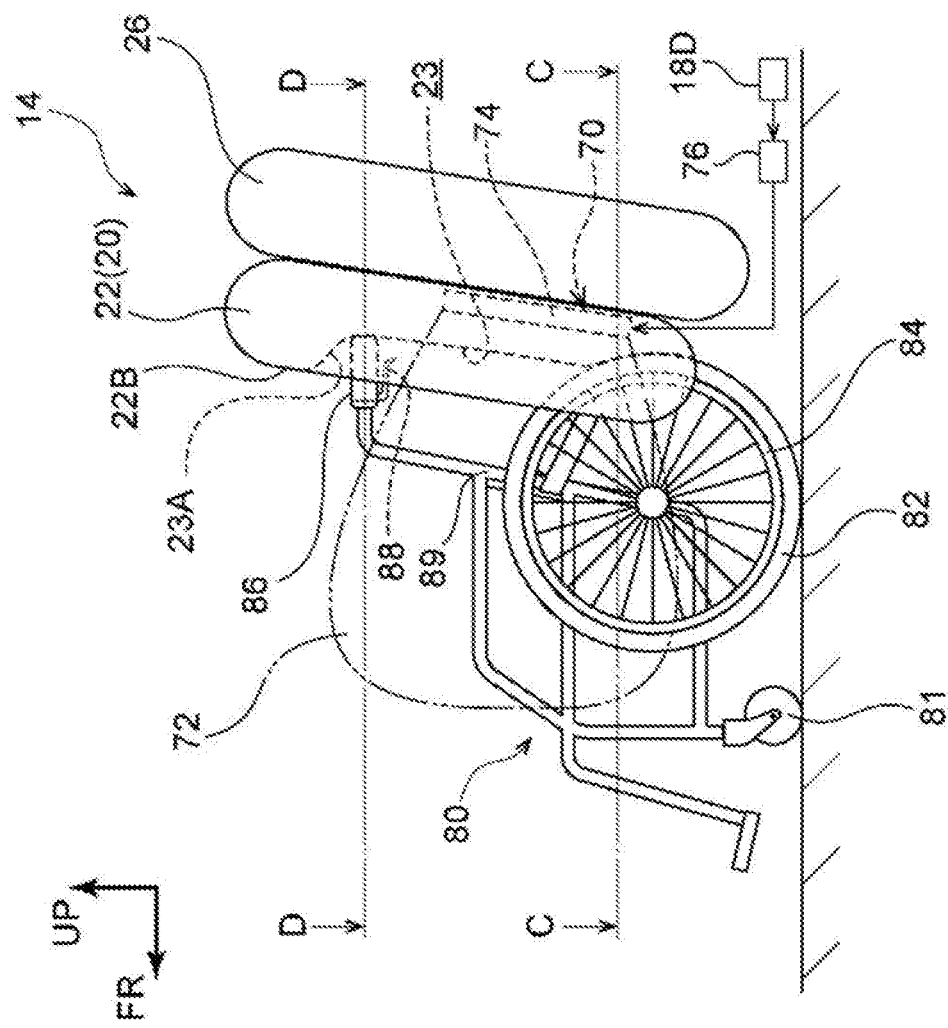
FIG. 11 is a side view of a vehicle seat according to a fifth embodiment, illustrating a state where a side airbag is deployed.

In the event of a side collision of the vehicle 10, when the acceleration sensor of the controller 76 detects the collision, the inflator 74 is actuated to supply a gas into the airbag 72. As a result, as illustrated in FIG. 11, the airbag 72 is expanded and deployed toward the front of the wheelchair 80.

The airbag 72 is deployed within a range from a caster 81 of the wheelchair 80 to the movable seat cushion 22 in the front-rear direction and within a range from the handgrip 86 to an axle of the wheel 82 in the up-down direction. Thus, the airbag 72 protects the body part of the wheelchair occupant H from the chest to the waist in the event of a side collision of the vehicle 10.

The controller 76 of the side airbag device 70 of the present embodiment is electrically connected to a detector 18D provided in the tip-up mechanism 18. The detector 18D outputs a detection signal based on the pivot position of the arm plates 18B when the movable seat cushion 22 is in the tip-up state. Thus, the controller 76 detects the tip-up state of the movable seat cushion 22. Then, the controller 76 permits the operation of the side airbag device 70 when the controller 76 detects the tip-up state. That is, the controller 76 causes the airbag 72 to be deployed in the event of a side collision. On the other hand, the controller 76 prohibits the operation of the side airbag device 70 when the controller 76 has not detected the tip-up state.

The present embodiment produces the following advantageous effects in addition to the advantageous effects of the foregoing embodiments. That is, in the present embodiment, because the movable seat cushion 22 is provided with the side airbag device 70 for the wheelchair occupant H, it is possible to reduce an injury value of the wheelchair occupant H in the event of a side collision of the vehicle 10. Further, in the present embodiment, whether or not the operation of the side airbag device 70 is permitted is determined based on whether or not the tip-up state is detected. As a result, it is possible to prevent the side airbag device 70 from being unnecessarily operated when the movable seat cushion 22 is in the normal state.

Sixth Embodiment

Figure 13:
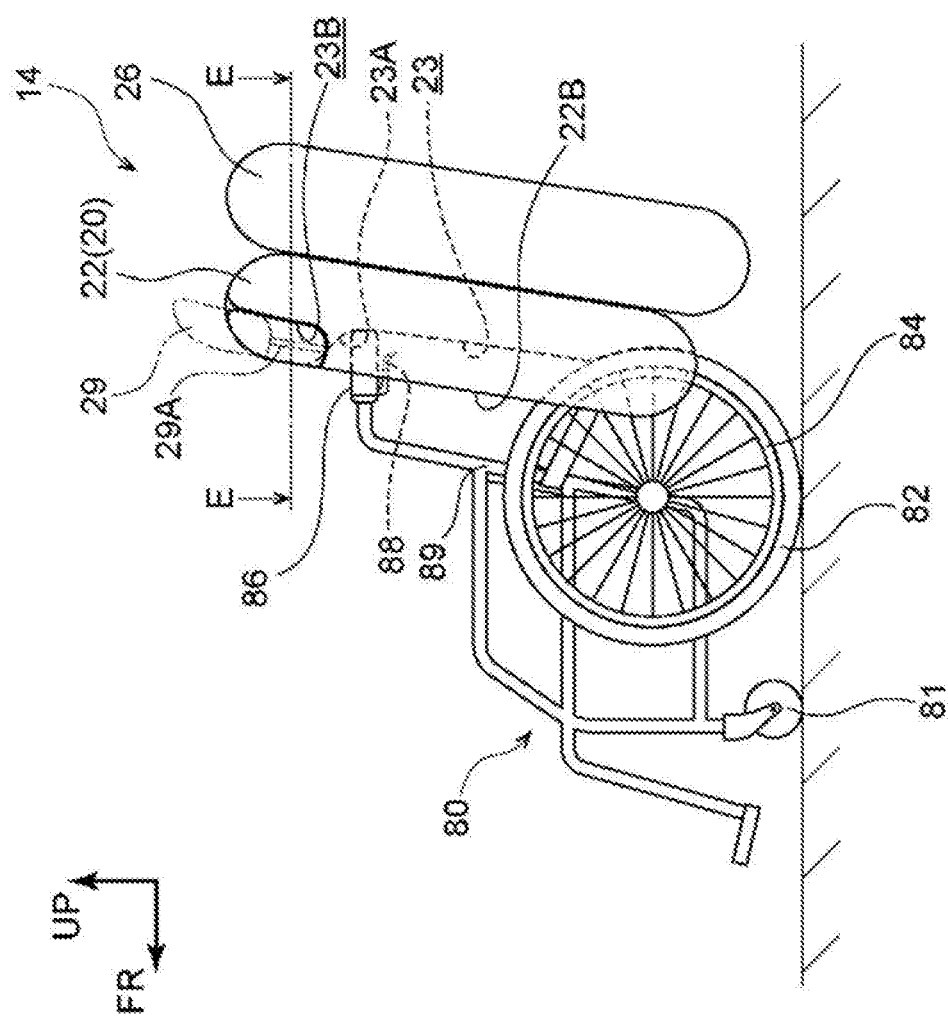
FIG. 13 is a side view of a vehicle seat according to a sixth embodiment, illustrating a state where a wheelchair is fixed to the vehicle seat.
Figure 14:
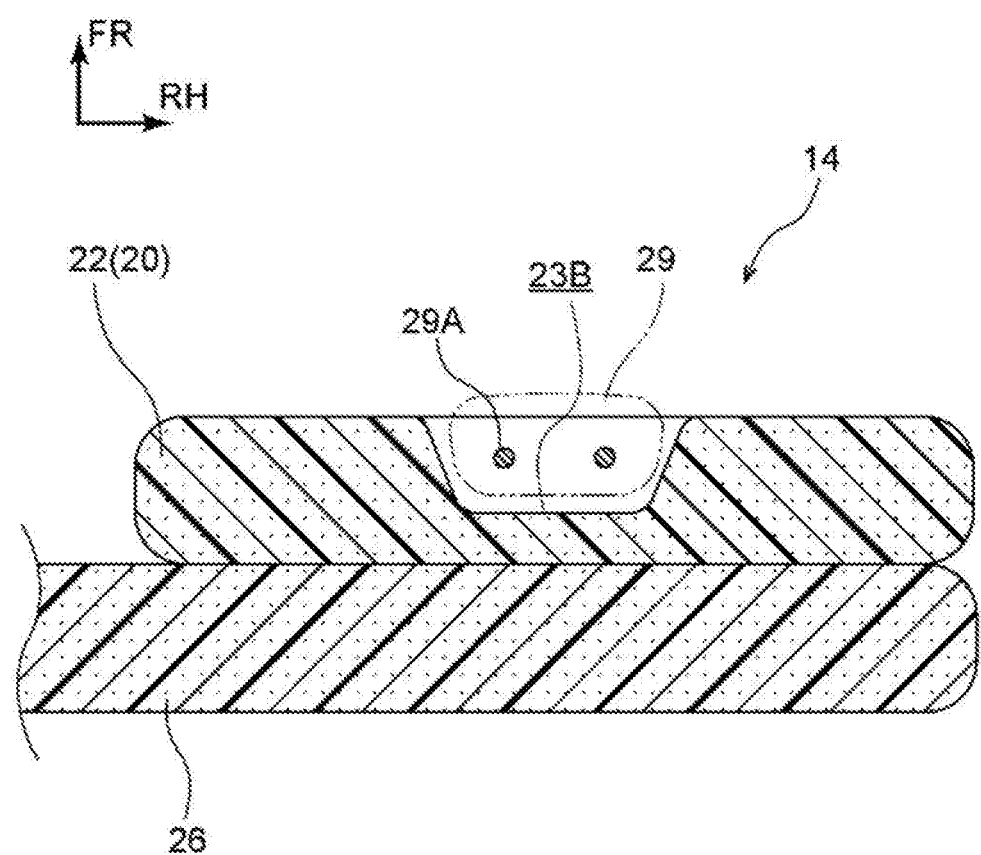
FIG. 14 is an enlarged sectional view of the vehicle seat according to the sixth embodiment taken along line E-E in FIG. 13, illustrating a structure of an auxiliary headrest.

In a sixth embodiment, a headrest is housed in the movable seat cushion 22, and the other configurations are the same as those in the fourth embodiment. Hereinafter, the differences from the fourth embodiment will be described. Note that, the same configurations as those in the first and fourth embodiments will be denoted by the same reference signs as those in the first and fourth embodiments, and detailed description thereof will be omitted As illustrated in FIG. 13 and FIG. 14, in the present embodiment, a recessed portion 23B is provided in the movable seat cushion 22, at a position that is above the recessed portion 23 of the movable seat cushion 22 in the tip-up state and that is at the center of the movable seat cushion 22 in the seat-width direction. An auxiliary headrest 29, which is a headrest for the wheelchair occupant H, is supported in the recessed portion 23B so as to be movable in the up-down direction. The auxiliary headrest 29 has a shape conforming to the recessed portion 23B. The auxiliary headrest 29 as well as the movable seat cushion 22 includes an elastic member made of foamed urethane and an upholstery member made of cloth or leather and covering the elastic member.

Figure 15:
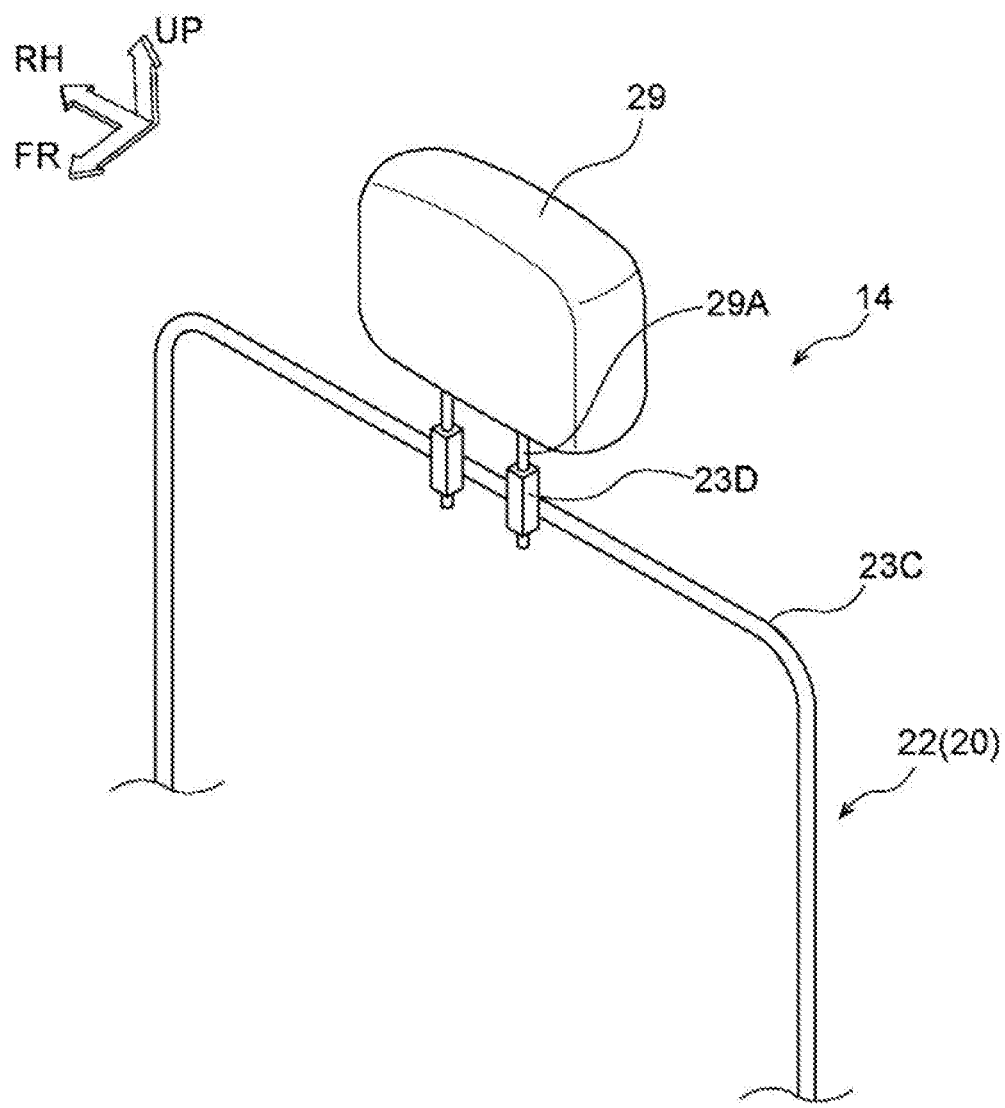
FIG. 15 is a main part perspective view of the vehicle seat according to the sixth embodiment, illustrating the auxiliary headrest and an inner structure of a seat cushion.

The auxiliary headrest 29 is provided with a pair of right and left headrest stays 29A extending downward. As illustrated in FIG. 15, when headrest stays 29A are inserted into holders 23D provided at an upper portion of the seat cushion frame 23C, the auxiliary headrest 29 is supported by the movable seat cushion 22.

In the present embodiment, when the movable seat cushion 22 is in the normal state, the auxiliary headrest 29 is housed in the movable seat cushion 22. Therefore, when the ordinary occupant P is seated in the front seat 14, the auxiliary headrest 29 does not obstruct the movement of the ordinary occupant P. On the other hand, when the movable seat cushion 22 is in the tip-up state, the wheelchair occupant H raises the auxiliary headrest 29 upward, so that the auxiliary headrest 29 can be used as a headrest dedicated for the wheelchair occupant H.

According to the present embodiment, the movable seat cushion 22 is provided with the auxiliary headrest 29 for the wheelchair occupant H. Thus, it is possible to improve the comfort of the wheelchair occupant H and to reduce damage to the neck of the wheelchair occupant H in the event of a rear-end collision of the vehicle 10.

Figure 16:
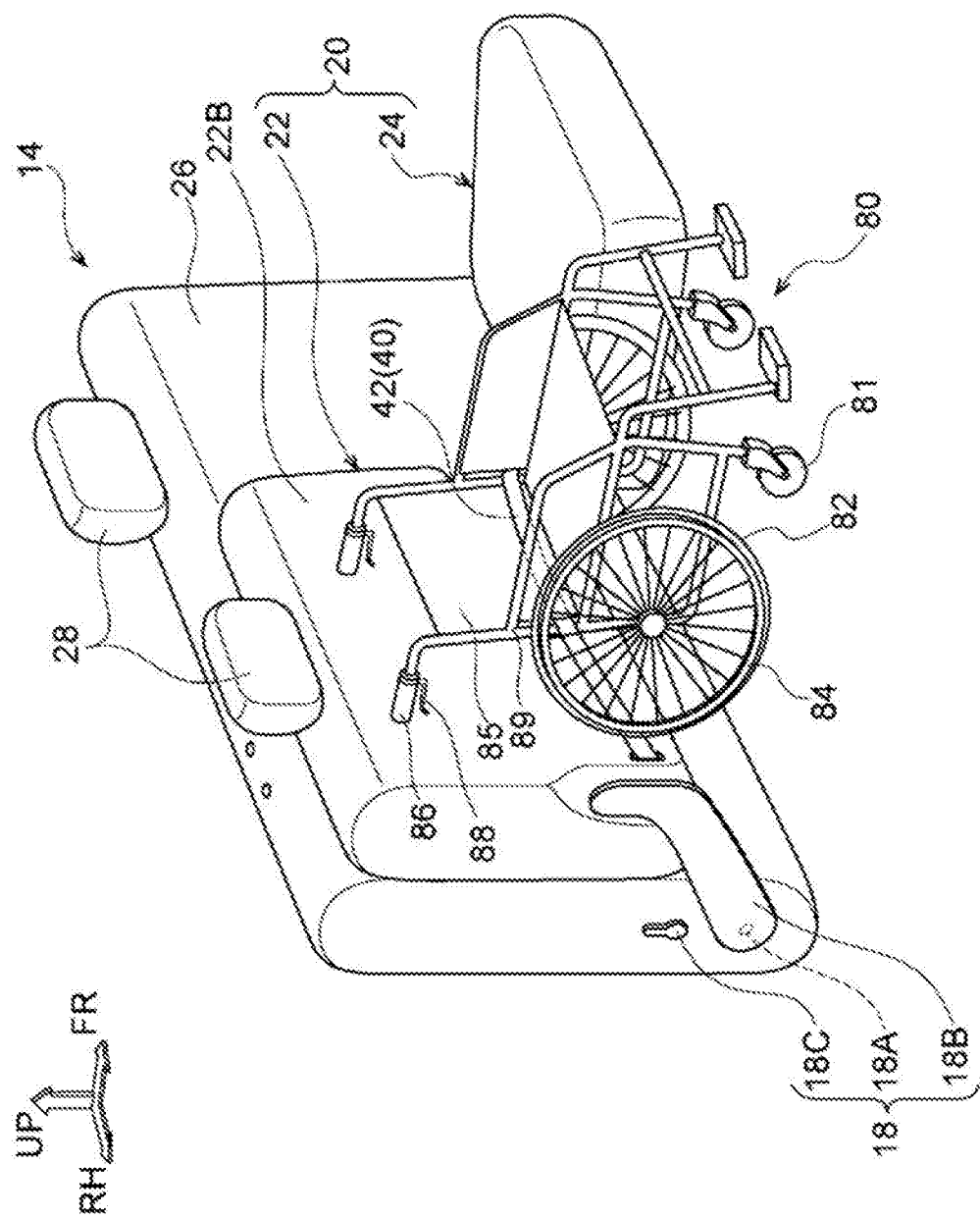
FIG. 16 is a perspective view of a vehicle seat according to a modified example of the sixth embodiment, illustrating a state where a headrest is attached to a seat cushion.

In the present embodiment, the auxiliary headrest 29 that can be housed in the movable seat cushion 22 is provided as the headrest for the wheelchair occupant H. However, the headrest for the wheelchair occupant H is not limited to this. For example, in a modified example of the sixth embodiment, as illustrated in FIG. 16, holders configured to support the headrest stays are built in the upper end portion of the movable seat cushion 22 in the tip-up state, so that the headrest 28 for the ordinary occupant P can be attached to the movable seat cushion 22. That is, in the modified example, the ordinary occupant P and the wheelchair occupant H share the headrest 28. In this case, the wheelchair occupant H can use the headrest 28 as the headrest for the wheelchair occupant H, by placing the movable seat cushion 22 in the tip-up state, removing the headrest 28 from the seatback 26, and attaching the headrest 28 to the movable seat cushion 22.

Seventh Embodiment

A seventh embodiment is different from the first to sixth embodiments in the structure of a wheelchair fixing device. Hereinafter, the differences from the first embodiment will be described. Note that, the same configurations as those in the first embodiment will be denoted by the same reference signs as those in the first embodiment, and detailed description thereof will be omitted.

Figure 17:
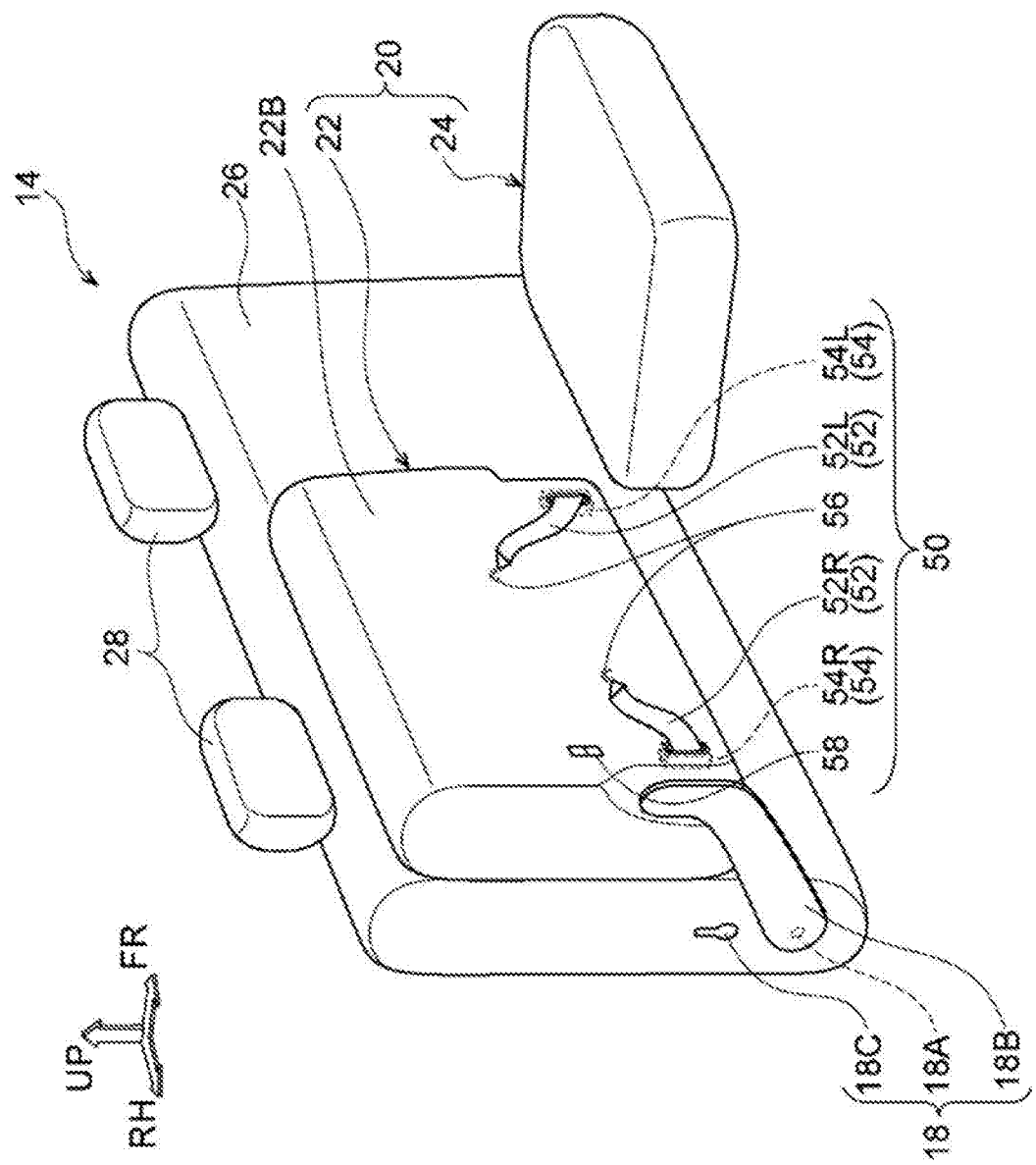
FIG. 17 is a perspective view of a vehicle seat according to a seventh embodiment, illustrating a tip-up state of a seat cushion.

As illustrated in FIG. 17, a wheelchair fixing device 50 configured to fix the wheelchair 80 is provided on the rear surface 22B-side of the movable seat cushion 22, at a position in a lower portion of the movable seat cushion 22 in the tip-up state. The wheelchair fixing device 50 of the present embodiment includes fixing webbings 52, fixing retractors 54, fixing hooks 56, and a changeover switch 58.

The fixing webbings 52 are belts that restrain the wheelchair 80. The fixing webbings 52 extend from portions of the rear surface 22B of the movable seat cushion 22, and the portions are respectively on opposite sides, in the seat-width direction, of the wheelchair 80 that is fixed to the movable seat cushion 22 such that the rear side of the wheelchair 80 faces the rear surface 22B of the movable seat cushion 22 in the tip-up state. The fixing webbings 52 include a right webbing 52R provided at a right-side portion of the movable seat cushion 22, and a left webbing 52L provided at a left-side portion of the movable seat cushion 22.

Each of the fixing retractors 54 is switchable between an unlocked state where extension and retraction of a corresponding one of the fixing webbings 52 are allowed and a locked state where only retraction of the corresponding one of the fixing webbings 52 is allowed. As illustrated in FIG. 20A, the fixing retractors 54 include a right retractor 54R that is built in a right-side portion of the movable seat cushion 22 and used for the right webbing 52R, and a left retractor 54L that is built in a left-side portion of the movable seat cushion 22 and used for the left webbing 52L.

Figure 21A:
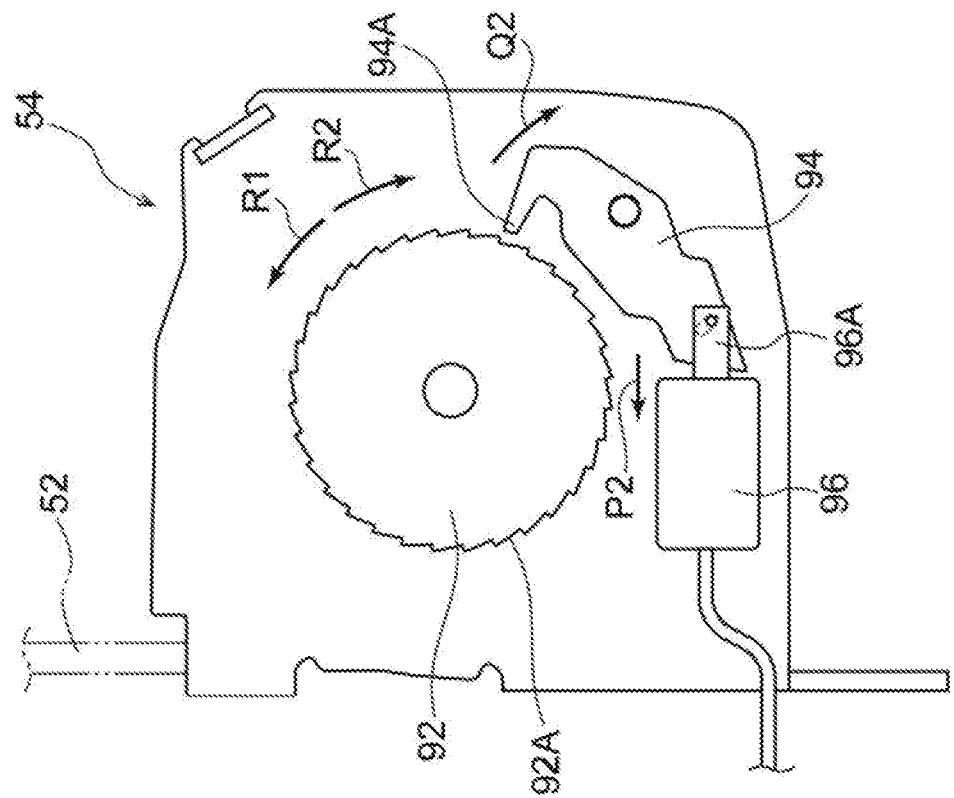
FIG. 21A is a view illustrating an operation of the fixing retractor according to the seventh embodiment and illustrating a locked state.
Figure 21B:
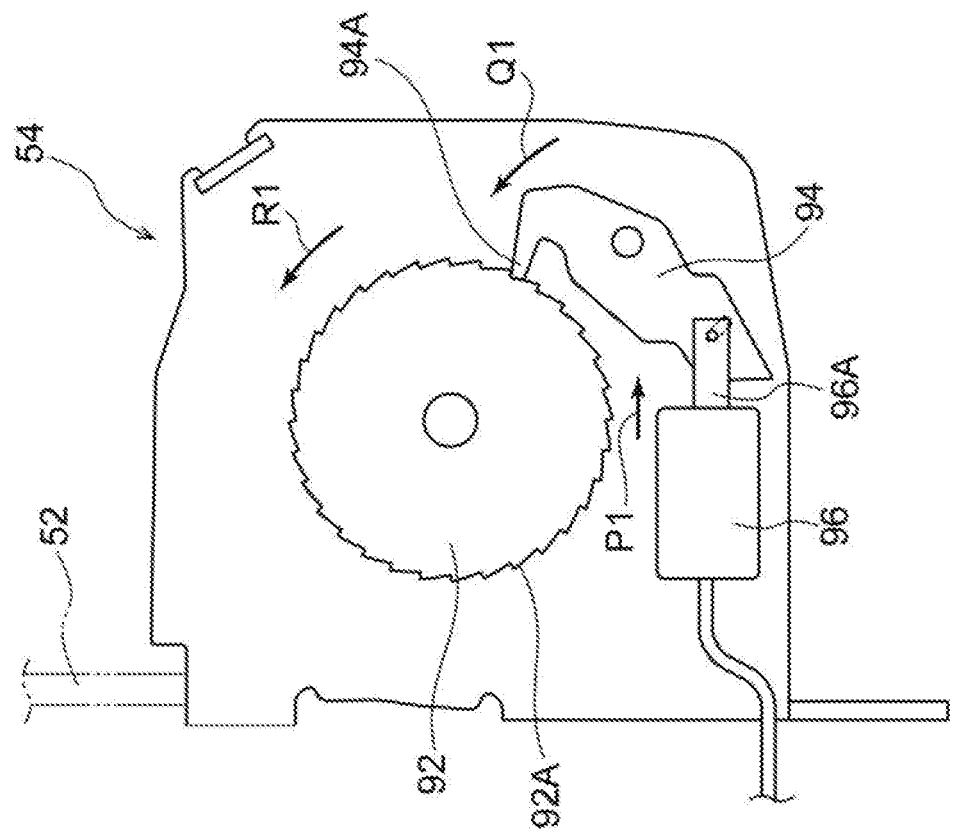
FIG. 21B is a view illustrating an operation of the fixing retractor according to the seventh embodiment and illustrating an unlocked state.

As illustrated in FIG. 21A and FIG. 21B, each fixing retractor 54 includes a spool (not illustrated) on which the fixing webbing 52 is reeled (wound), a ratchet gear 92 fixed to the spool, a pawl 94 configured to engage with the ratchet gear 92, and a solenoid 96 configured to drive the pawl 94. The ratchet gear 92 includes teeth 92A, which are serrations. The inclination of each tooth 92A in the retraction (reeling) direction (the direction of an arrow R1) of the fixing webbing 52 is moderate, and the inclination thereof in the extension (unreeling) direction (the direction of an arrow R2) of the fixing webbing 52 is steep.

The pawl 94 is pivotably supported at its center portion. The locked state illustrated in FIG. 21A is achieved when a locking portion 94A of the pawl 94, which is a distal end portion of the pawl 94, contacts the tooth 92A of the ratchet gear 92 as a result of a pivot motion of the pawl 94 in the direction of an arrow Q1. Thus, the ratchet gear 92 is allowed to rotate in the retraction direction (the direction of the arrow R1) of the fixing webbing 52 because the locking portion 94A can climb over the teeth 92A. On the other hand, the ratchet gear 92 is not allowed to rotate in the extension direction (the direction of the arrow R2 in FIG. 21B) of the fixing webbing 52 because the locking portion 94A cannot climb over the teeth 92A.

On the other hand, the unlocked state illustrated in FIG. 21B is achieved when the locking portion 94A of the pawl 94 separates from the tooth 92A of the ratchet gear 92 as a result of a pivot motion of the pawl 94 in the direction of an arrow Q2. Thus, the ratchet gear 92 is allowed to rotate in the retraction direction (the direction of the arrow R1) and the extension direction (the direction of the arrow R2) of the fixing webbing 52.

The solenoid 96 includes a plunger 96A that is extruded while being urged by a spring (not illustrated), and that is retracted upon energization of a coil (not illustrated). The locked state illustrated in FIG. 21A is achieved when the plunger 96A is extruded in the direction of an arrow P1 by an urging force of the spring and the pawl 94 pivots in the direction of the arrow Q1. On the other hand, the unlocked state illustrated in FIG. 21B is achieved when the plunger 96A is attracted toward the coil and is thus retracted in the direction of an arrow P2, and the pawl 94 pivots in the direction of the arrow Q2.

Figure 18:
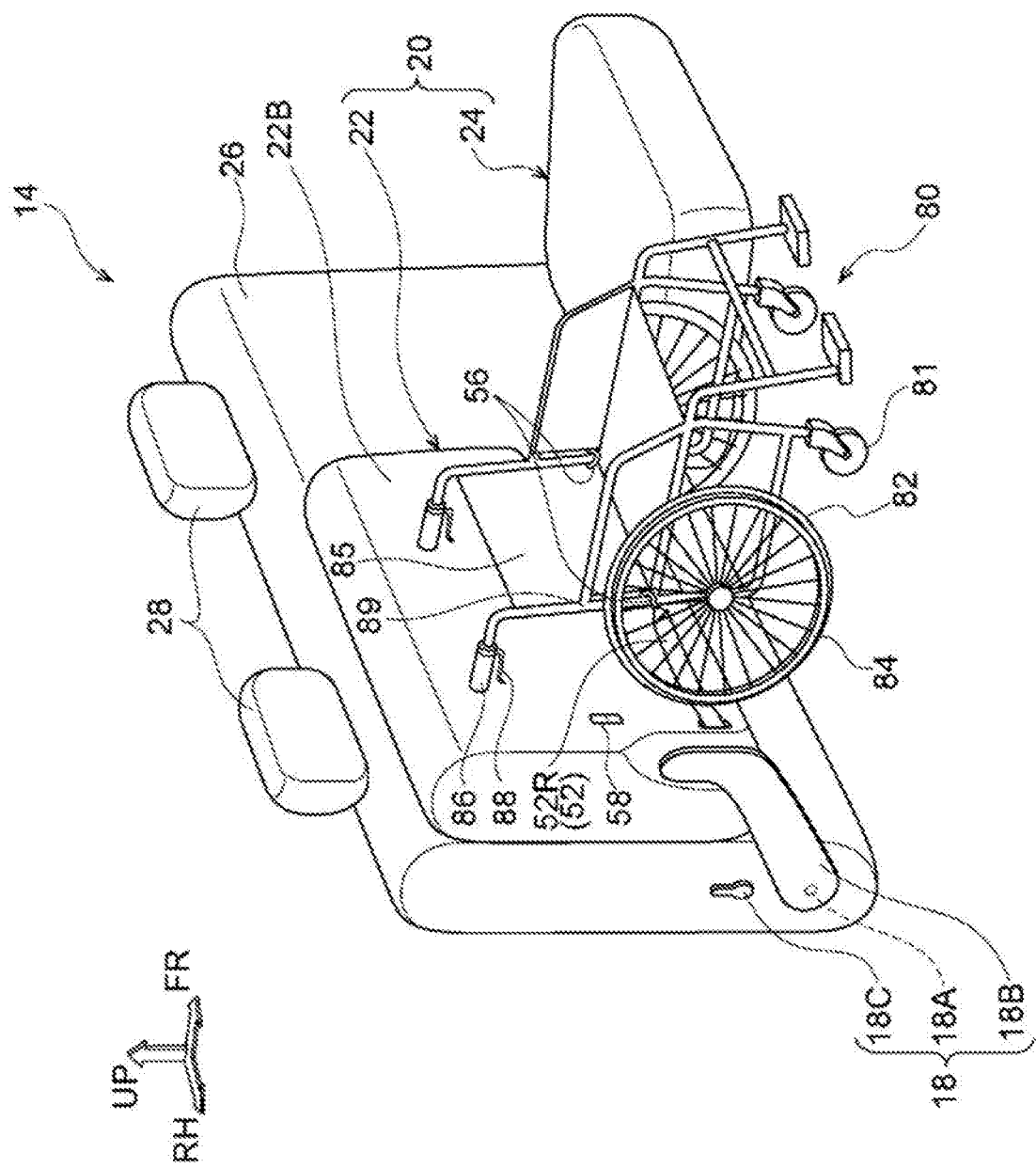
FIG. 18 is a perspective view of the vehicle seat according to the seventh embodiment, illustrating a state where a wheelchair is fixed to the vehicle seat.

As illustrated in FIG. 17 to FIG. 19, each fixing hook 56 is an S-shaped metallic member fixed to the distal end of a corresponding one of the fixing webbings 52, and is used to lock the wheelchair 80 while being hooked to a pipe frame 89 of the wheelchair 80. Each of the right webbing 52R and the left webbing 52L is provided with the fixing hook 56.

The changeover switch 58 is used to switch the right retractor 54R and the left retractor 54L between the unlocked state and the locked state. The changeover switch 58 is provided on a right-side portion of the movable seat cushion 22, at a position above the right retractor 54R. The changeover switch 58 of the present embodiment is a rocker switch. When the changeover switch 58 is tilted toward one side, the locked state is achieved. On the other hand, when the changeover switch 58 is tilted toward the other side, the unlocked state is achieved. As illustrated in FIG. 20B, the changeover switch 58 is connected to the fixing retractor 54 and is connected to the coil of the solenoid 96.

Operations

Next, operations of the present embodiment will be described along with a procedure by which the wheelchair occupant H gets aboard the vehicle 10. The procedure from when the wheelchair occupant H gets on the vehicle 10 until when the wheelchair occupant H parks the wheelchair 80 such that the wheelchair 80 is disposed with its back against the movable seat cushion 22 is the same as that of the first embodiment. The wheelchair 80 is parked between the right webbing 52R and the left webbing 52L.

Next, the wheelchair occupant H stretches out his/her hand to the right side of the wheelchair 80 and operates the changeover switch 58 to achieve the unlocked state. Then, the wheelchair occupant H extend the right webbing 52R and the left webbing 52L forward, and hooks the fixing hooks 56 to the pipe frame 89 of the wheelchair 80, as illustrated in FIG. 18.

Next, the wheelchair occupant H stretches out his/her hand again to the right side of the wheelchair 80 and operates the changeover switch 58 to achieve the locked state. Then, the wheelchair occupant H causes each fixing webbing 52 to be retracted into the corresponding fixing retractor 54 while pushing the wheelchair 80 against the rear surface 22B of the movable seat cushion 22, so that the wheelchair 80 is restrained by the front seat 14.

Outline of Seventh Embodiment

According to the present embodiment described above, the wheelchair occupant H can fix the wheelchair 80 by himself/herself in the vehicle 10 that is configured to allow the wheelchair occupant H seated in the wheelchair 80 to get thereon, as in the first embodiment.

The wheelchair fixing device 50 of the present embodiment includes the fixing retractors 54 that can be switched between the unlocked state and the locked state. According to the present embodiment, the wheelchair occupant H can easily fix the wheelchair 80 by pushing the wheelchair 80 against the movable seat cushion 22 in the tip-up state, locking the wheelchair 80 with the fixing hooks 56 in the unlocked state, and then switching the fixing retractors 54 to the locked state. Because the fixing hooks 56 of the wheelchair fixing device 50 are used to fix the wheelchair 80, the wheelchair fixing device 50 can be used to fix various kinds of wheelchairs 80 that differ in size and shape.

With the configuration of the front seat 14 of the present embodiment, the wheelchair occupant H can easily pull the fixing webbings 52 and the fixing hooks 56 such that they approach each other, because the fixing webbings 52 and the fixing hooks 56 are exposed on the rear surface 22B of the movable seat cushion 22 in the tip-up state. The front seat 14 of the present embodiment is configured to allow the wheelchair occupant H to easily perform an operation for fixing the wheelchair 80 while the wheelchair occupant H remains seated in the wheelchair 80.

In the present embodiment, the solenoids 96 are electromagnetically operated by the changeover switch 58 to switch the fixing retractors 54 between the unlocked state and the locked state. However, the manner of switching the fixing retractors 54 is not limited to this. For example, the rear surface 22B of the movable seat cushion 22 may be provided with a lever switch or the like, and the pawls 94 of the fixing retractors 54 may be operated by a mechanical link to switch the fixing retractors 54 between the unlocked state and the locked state.

Remark

The front seat 14 of each embodiment may be turnable about an axis extending in the up-down direction. For example, when the driving mode of the vehicle 10 is switched from an autonomous driving mode to a manual driving mode, the ordinary occupant P (or the wheelchair occupant H) seated in the front seat 14 that has been turned so as to face forward serves as a driver.

In each embodiment, the vehicle seat to which the wheelchair 80 is to be fixed may be the rear seat 16 instead of the front seat 14. Furthermore, the vehicle seat to which the wheelchair 80 is to be fixed may be both the front seat 14 and the rear seat 16.

In the disclosure, the foregoing embodiments may be implemented in combination. For example, the front seat 14 of the second embodiment may be provided with the side airbag device 70 of the fifth embodiment. For example, the front seat 14 of the seventh embodiment may be provided with the seatbelt device 60 for a wheelchair occupant of the second or third embodiment.

What is claimed is:

1. A vehicle seat comprising:
    a seatback;
    a seat cushion switchable to a tip-up state where the seat cushion has been tipped up so as to extend along the seatback, the seat cushion including a seating surface and a rear surface that is on an opposite side of the seat cushion from the seating surface; and
    a wheelchair fixing device provided on the rear surface of the seat cushion, the wheelchair fixing device being configured to fix a wheelchair to the seat cushion, wherein
    the wheelchair fixing device is a two-point seatbelt device including: (i) a retractable restraining webbing provided with a restraining tongue plate at a distal end of the restraining webbing; (ii) a restraining buckle engageable with the restraining tongue plate of the restraining webbing; and (iii) a restraining retractor including an automatic locking mechanism configured to lock extension of the restraining webbing, and
    the restraining webbing and the restraining buckle are located on opposite sides, in a seat-width direction, of the rear surface of the seat cushion.

2. The vehicle seat according to claim 1, wherein:
    the restraining tongue plate and the restraining buckle are exposed on the rear surface of the seat cushion; and
    the restraining tongue plate and the restraining buckle are provided apart from each other such that the restraining tongue plate and the restraining buckle are respectively on opposite sides, in the seat-width direction, of the wheelchair that is fixed to the seat cushion such that a rear side of the wheelchair faces the rear surface of the seat cushion in the tip-up state.

3. The vehicle seat according to claim 1, further comprising an additional buckle for a wheelchair occupant, the additional buckle being provided adjacent to the restraining buckle, wherein
    the additional buckle is engageable with a shared tongue plate that is shared with a seatbelt device for an ordinary occupant of a vehicle in which the vehicle seat is provided.

4. The vehicle seat according to claim 3, further comprising:
    an additional webbing provided on a same side of the seat cushion as the restraining webbing in the seat-width direction, the additional webbing being provided with an additional tongue plate engageable with the additional buckle; and
    an additional retractor configured to retract the additional webbing.

5. The vehicle seat according to claim 1, wherein the seat cushion is configured to attach a headrest to an upper portion of the seat cushion in a seat-height direction when the seat cushion is in the tip-up state.

6. A vehicle seat arrangement structure comprising:
    the vehicle seat according to claim 1, the vehicle seat being a front seat provided so as to face rearward in a vehicle front-rear direction and including the seat cushion to which a wheelchair is fixed so as to face rearward in the vehicle front-rear direction; and
    a rear seat provided so as to face forward in the vehicle front-rear direction, the rear seat facing the vehicle seat.

7. A vehicle seat comprising:
    a seatback;
    a seat cushion switchable to a tip-up state where the seat cushion has been tipped up so as to extend along the seatback, the seat cushion including a seating surface and a rear surface that is on an opposite side of the seat cushion from the seating surface; and
    a wheelchair fixing device provided on the rear surface of the seat cushion, the wheelchair fixing device being configured to fix a wheelchair to the seat cushion, wherein:
    the seat cushion includes a recessed portion that is provided in the rear surface and that is recessed toward the seating surface; and
    a handgrip and a wheel of the wheelchair are housed in the recessed portion when the seat cushion is in the tip-up state.

8. The vehicle seat according to claim 7, wherein:
    the seat cushion includes a pair of the recessed portions;
    the recessed portions are respectively provided in opposite side portions of the seat cushion in a seat-width direction;
    the rear surface of the seat cushion includes ceiling wall portions respectively provided on upper sides of the recessed portions in a seat-height direction when the seat cushion is in the tip-up state; and
    each of the ceiling wall portions faces the handgrip housed in a corresponding one of the recessed portions.

9. The vehicle seat according to claim 7, wherein the wheelchair fixing device includes:
    a pair of fixing webbings extending from portions of the rear surface of the seat cushion, the portions being respectively on opposite sides, in a seat-width direction, of the wheelchair that is fixed to the seat cushion such that a rear side of the wheelchair faces the rear surface of the seat cushion in the tip-up state;

a pair of fixing hooks respectively provided at distal ends of the fixing webbings, the fixing hooks being configured to lock the wheelchair; and a pair of fixing retractors, each of the fixing retractors being switchable between an unlocked state where extension and retraction of a corresponding one of the fixing webbings are allowed and a locked state where only retraction of the corresponding one of the fixing webbings is allowed.

10. The vehicle seat according to claim 7, wherein
the wheelchair fixing device is a two-point seatbelt device including: (i) a retractable restraining webbing provided with a restraining tongue plate at a distal end of the restraining webbing; (ii) a restraining buckle engageable with the restraining tongue plate of the restraining webbing; and (iii) a restraining retractor including an automatic locking mechanism configured to lock extension of the restraining webbing, and
the restraining webbing and the restraining buckle are located on opposite sides, in a seat-width direction, of the rear surface of the seat cushion.

11. A vehicle seat comprising:
a seatback;
a seat cushion switchable to a tip-up state where the seat cushion has been tipped up so as to extend along the seatback, the seat cushion including a seating surface and a rear surface that is on an opposite side of the seat cushion from the seating surface;
a wheelchair fixing device provided on the rear surface of the seat cushion, the wheelchair fixing device being configured to fix a wheelchair to the seat cushion; and,
a side airbag device provided in an end portion of the seat cushion in a seat-width direction, the side airbag device being configured to be deployed from the rear surface.

12. The vehicle seat according to claim 11, wherein an operation of the side airbag device is prohibited in any state other than the tip-up state.

13. The vehicle seat according to claim 11, wherein
the wheelchair fixing device is a two-point seatbelt device including: (i) a retractable restraining webbing provided with a restraining tongue plate at a distal end of the restraining webbing; (ii) a restraining buckle engageable with the restraining tongue plate of the restraining webbing; and (iii) a restraining retractor including an automatic locking mechanism configured to lock extension of the restraining webbing, and
the restraining webbing and the restraining buckle are located on opposite sides, in a seat-width direction, of the rear surface of the seat cushion.

14. The vehicle seat according to claim 11, wherein
the wheelchair fixing device includes:
a pair of fixing webbings extending from portions of the rear surface of the seat cushion, the portions being respectively on opposite sides, in a seat-width direction, of the wheelchair that is fixed to the seat cushion such that a rear side of the wheelchair faces the rear surface of the seat cushion in the tip-up state;
a pair of fixing hooks respectively provided at distal ends of the fixing webbings, the fixing hooks being configured to lock the wheelchair; and
a pair of fixing retractors, each of the fixing retractors being switchable between an unlocked state where extension and retraction of a corresponding one of the fixing webbings are allowed and a locked state where only retraction of the corresponding one of the fixing webbings is allowed.

* * * * *